United States Patent
Caine et al.

(10) Patent No.: US 12,260,208 B2
(45) Date of Patent: Mar. 25, 2025

(54) PAUSING AUTOMATIC SOFTWARE UPDATES OF VIRTUAL MACHINES

(71) Applicant: Sophos Limited, Abingdon (GB)

(72) Inventors: Jonathan Francis Caine, Abingdon (GB); Neil Robert Tyndale Watkiss, Oxford (GB); Timothy Rayment, Abingdon (GB)

(73) Assignee: Sophos Limited, Abingdon (GB)

( * ) Notice: Subject to any disclaimer, the term of this patent is extended or adjusted under 35 U.S.C. 154(b) by 221 days.

(21) Appl. No.: 17/959,612

(22) Filed: Oct. 4, 2022

(65) Prior Publication Data

US 2024/0111513 A1    Apr. 4, 2024

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45562* (2013.01)

(58) Field of Classification Search
CPC ................... G06F 8/65; G06F 9/45558; G06F 2009/45562
See application file for complete search history.

(56) References Cited

U.S. PATENT DOCUMENTS

| | | | |
|---|---|---|---|
| 8,918,785 B1* | 12/2014 | Brandwine | G06F 9/455 718/1 |
| 9,009,836 B1* | 4/2015 | Yarykin | G06F 9/45558 726/25 |
| 9,280,338 B1* | 3/2016 | Stickle | G06F 9/44536 |
| 9,697,019 B1* | 7/2017 | Fitzgerald | H04L 41/08 |
| 10,705,823 B2* | 7/2020 | Pitre | H04L 41/5054 |
| 10,769,250 B1* | 9/2020 | Tautschnig | G06F 21/577 |
| 2007/0294684 A1* | 12/2007 | Kumashiro | G06F 8/65 717/168 |
| 2015/0256341 A1* | 9/2015 | Ye | H04L 9/321 713/164 |
| 2018/0285093 A1* | 10/2018 | Scheidel | G06F 9/45558 |
| 2019/0102162 A1* | 4/2019 | Pitre | H04L 63/10 |
| 2020/0379744 A1* | 12/2020 | Bhupati | H04L 67/61 |
| 2020/0409680 A1* | 12/2020 | Vaddi | G06F 8/71 |
| 2021/0067607 A1* | 3/2021 | Gardner | H04L 41/082 |
| 2021/0311720 A1* | 10/2021 | Yin | H04L 9/50 |
| 2023/0004404 A1* | 1/2023 | Lindholm | G06F 9/44505 |
| 2023/0412641 A1 | 12/2023 | Watkiss et al. | |
| 2023/0418585 A1* | 12/2023 | Wang | G06F 8/65 |

* cited by examiner

*Primary Examiner* — Douglas M Slachta
(74) *Attorney, Agent, or Firm* — Strategic Patents, P.C.

(57) ABSTRACT

Adapting automatic software update behavior for virtual desktop infrastructure deployed endpoints includes detecting a request for services of a threat management facility for an enterprise network that originates from a compute instance embodied as a virtual machine instantiated from a versioned software template, and updating software on the compute instance based on a determination of availability of updated software for the compute instance and an update pause parameter indicating that updating software for virtual machines instantiated from the versioned software template is permitted for the compute instance.

20 Claims, 12 Drawing Sheets

PAUSING AUTOMATIC SOFTWARE UPDATES OF VIRTUAL MACHINES

TECHNICAL FIELD

This application relates to network security. This application more particularly relates to automatic updating of security software on virtual machine-based endpoints in an enterprise network.

BACKGROUND

A security infrastructure for an enterprise network may include security software that is deployed and executed on endpoints in the enterprise network. Software on these endpoints, such as security agents and the like, may be automatically updated from time to time to ensure integrity of security services provided in cooperation with a threat management facility of the enterprise network. However, automatically updating versions of endpoint software in an enterprise network may present compatibility issues with enterprise applications and may have other impacts on endpoints and/or network operations. It is desirable to mitigate these impacts when certain conditions are present in the enterprise network, such as the presence of endpoints instantiated as virtual machines based on a software template.

SUMMARY

In general, this disclosure is directed to adapting automatic software update behavior for one or more virtual desktop infrastructure deployed endpoints. In example embodiments, the automatic software update behavior includes detecting a request for services of a threat management facility for an enterprise network that originates from a compute instance embodied as a virtual machine instantiated from a versioned software template. Software on the compute instance may then be updated based on: 1) a determination of availability of updated software for the compute instance; and, 2) an update pause parameter indicating that updating software for virtual machines instantiated from the versioned software template is permitted for the compute instance.

In an aspect, there is disclosed herein a computer program product for adapting automatic software update behavior for endpoints deployed as virtual desktop infrastructure. The computer program product may include computer executable code embodied in a non-transitory computer-readable medium or the like that, when executing on one or more computing devices, performs a set of steps for adapting automatic software update behavior. The set of steps may include detecting a request for services of a threat management facility for an enterprise network. The set of steps may also include determining that the request originates from a compute instance embodied as a virtual machine instantiated from a versioned software template. The set of steps may further include determining availability of updated software for the compute instance based on comparing an aspect of the versioned software template used to instantiate the virtual machine to a recommended software version retrieved from an update data repository of the enterprise network. Further, the set of steps may include updating software on the compute instance based on the availability of updated software and an update pause parameter indicating that updating software for virtual machines instantiated from the versioned software template is permitted for the compute instance.

In the aspect, comparing an aspect of the versioned software template may include comparing a version parameter of the versioned software template and/or comparing indicia of a security agent configured to execute on the compute instance. In the aspect the indicia of the security agent may include a version parameter of the security agent executing on the compute instance. Further, the update pause parameter may apply to a virtual machine instantiated from a versioned software template that is within a range of software versions. Also, the update pause parameter may be calculated from a combination of a client-specific software update pause indication, and a version of security agent software executing on the compute instance. Further in the aspect, the update pause parameter may be calculated from a plurality of update pause inputs including update pause time factors, software template version, compute instance user type, compute instance enterprise network identifier, and compute instance security agent version. Yet further, the update pause parameter may include a temporal offset value that is relative to an update pause start time value. The temporal offset value may determine a duration of time for pausing updates.

Further in the aspect, the request for services may include a request for a determination of availability of updated software for the compute instance and/or indicia of a system configuration of the compute instance. In the aspect, determining that the request originates from a compute instance embodied as a virtual machine may be based on the indicia included in the request. Also, the recommended software version may be accessed from the update data repository based on the indicia included in the request. In the aspect, the update pause parameter may be accessed from the update data repository based on the indicia included in the request. In the aspect, updating software may include updating a local security agent of the compute instance. Updating may also include updating to a version of the software that is different than software indicated by the version parameter of the software template and that is different than the recommended software version.

In another aspect, there is disclosed herein a computer program product for adapting automatic software update behavior for virtual machine endpoints. The computer program product may include computer executable code embodied in a non-transitory computer readable medium or the like that, when executing on one or more computing devices, performs a set of steps for adapting automatic software update behavior. The set of steps may include detecting a request for services on an enterprise network that originates from a compute instance embodied as a virtual machine instantiated from a software template. The set of steps may also include determining availability of updated software for the compute instance based on comparing an aspect of the compute instance to a recommended software version retrieved from an update data repository of the enterprise network. The set of steps may further include updating software on the compute instance based on the availability of updated software and a composite update pause parameter indicating that updating software on the compute instance is permitted. This aspect may further include generating the composite update pause parameter in response to detecting the request for services. Further, generating the composite update pause parameter may include combining a plurality of update pause inputs including update pause time factors, software template version, compute instance user type, compute instance enterprise network identifier, and compute instance security agent version.

In another aspect, there is disclosed herein a computer program product for ensuring automatic security updates in a virtual desktop infrastructure deployment environment. The computer program product may include computer executable code embodied in a non-transitory computer readable medium or the like that, when executing on one or more computing devices, performs a set of steps for ensuring the automatic security updates. The set of steps may include detecting an update to a versioned software template used to instantiate a plurality of virtual machine compute instances receiving services of a threat management facility for an enterprise network. The set of steps may also include determining that the update originates from an administrator authorized to update the versioned software template, and updating software version data for the versioned software template in an update data repository accessible to the one or more computing devices. The set of steps may, based on an update pause parameter in the update data repository, cause at least one of the plurality of virtual machine compute instances that are instantiated from the versioned software template to install a version of software consistent with the updated versioned software template.

BRIEF DESCRIPTION OF THE FIGURES

The foregoing and other objects, features and advantages of the devices, systems, and methods described herein will be apparent from the following description of embodiments thereof, and as illustrated in the accompanying drawings. The drawings are not necessarily to scale, emphasis instead being placed upon illustrating the principles of the devices, systems, and methods described herein.

DESCRIPTION

Figure 1:
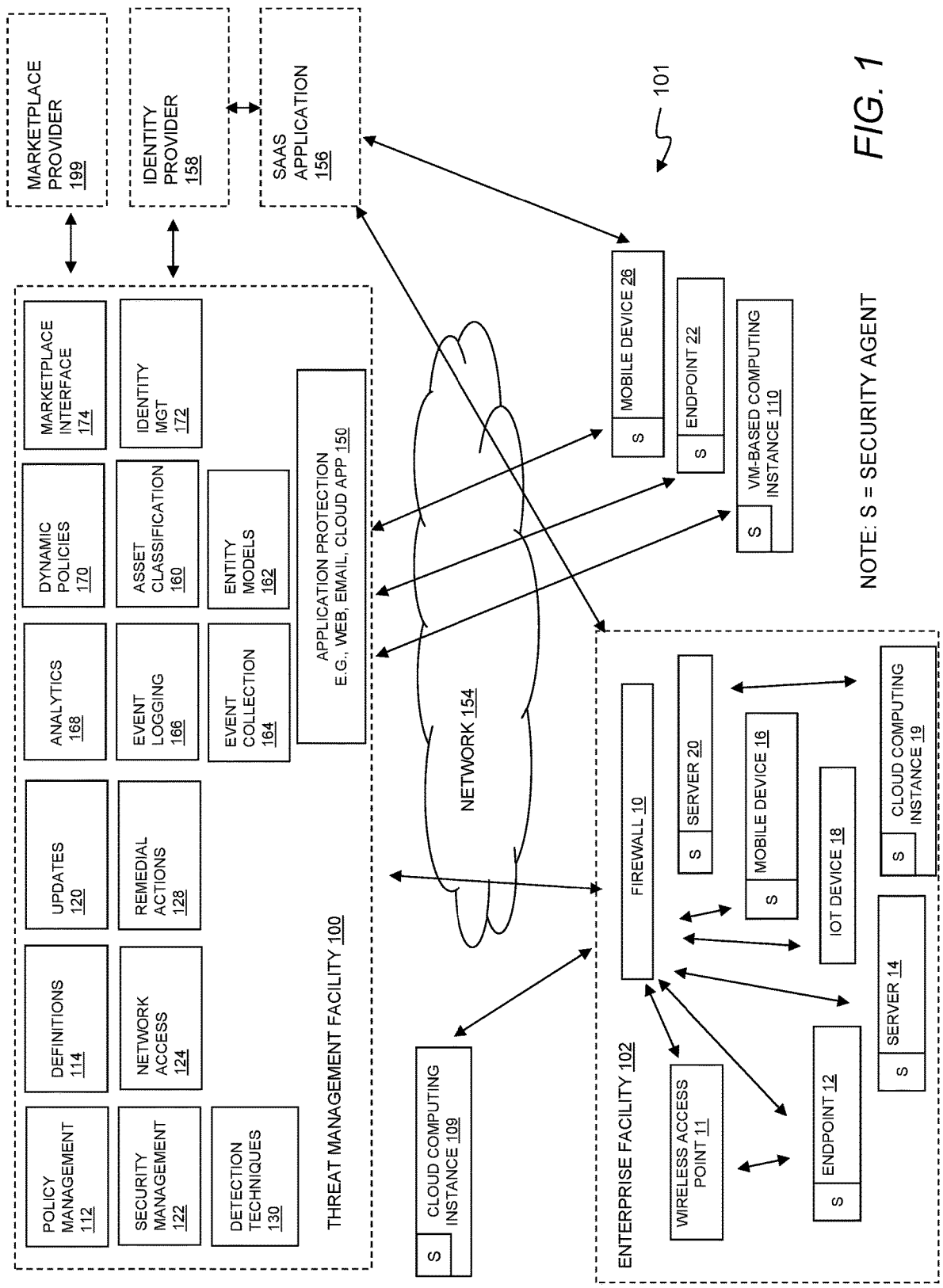
FIG. 1 depicts a block diagram of a threat management system, according to example embodiments.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular may be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, may be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification may be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network may be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection 150, asset classification facility 160, entity models 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It may be understood that the threat management facility 100 may be implemented in whole or in part on a number of different compute instances, with some parts of the threat management facility 100 on different compute instances in different locations. For example, some or all of one or more of the various facilities 100, 112-174 may be provided as part of a security agent S that is included in software running on a compute instance 10-26, 109, and 110 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26, 109, and 110. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, a virtual machine-based computing instance 110, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26, 109, and 110 may be protected from threats even when a compute instance 10-26, 109, and 110 is not connected to the enterprise facility 102 network, such as when compute instances 22, 26, 109, and 110 use a network that is outside of the enterprise facility 102 and separated from the enterprise facility 102, e.g., by a gateway, a public network, and so forth.

In some implementations, compute instances 10-26, 110 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26, 110 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, 109, and 110, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26, 109, and 110 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the threat management facility 100, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, 109, and 110, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management (e.g., as handled by a policy management facility 112) may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26, 109, and 110 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, 109, and 110, the enterprise facility 102 network and/or compute instances 10-26, 109, and 110 may pull information from the security facility 122 and policy management facility 112, or there may be a combination of pushing and pulling of information. For example, the enterprise facility 102 network and/or compute instances 10-26, 109, and 110 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26, 109, and 110 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26, 109, and 110. In various embodiments, policy updates, security updates (e.g., software patch, threat protection software, malware definition files) and other updates may be provided by the same or different modules, which may be the same or separate from a security agent running on one of the compute instances 10-26, 109, and 110.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26, 109, and 110 may be provided with new definitions periodically to include most recent threats. Updating of definitions may be managed by the update facility 120, and may be performed upon request from one of the compute instances 10-26, 109, and 110, upon a push, or some combination. Updates may be performed upon a time period, on demand from a device 10-26, 109, and 110, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, 109, and 110, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 may be granted access to a requested network location, e.g., inside or outside of the enterprise facility 102. Network access facility 124 may determine if a compute instance 22, 26, 109, 110 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26, 109, and 110 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., WINDOWS®, MACOS®, LINUX®, ANDROID™, IOS®). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109, a virtual machine-based computing instance 110, and so on. The events that may be collected may be determined by the entity models. There may be a variety of events collected. Events may include, for example, events generated by the enterprise facility 102 or the compute instances 10-26, 109, and 110, such as by monitoring streaming data through a gateway such as firewall 10 and wireless access point 11, monitoring activity of compute instances, monitoring stored files/data on the compute instances 10-26 such as desktop computers, laptop computers, other mobile computing devices, a virtual machine-based computing instance 110, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26, 109, and 110 or the enterprise facility 102.

Figure 2:
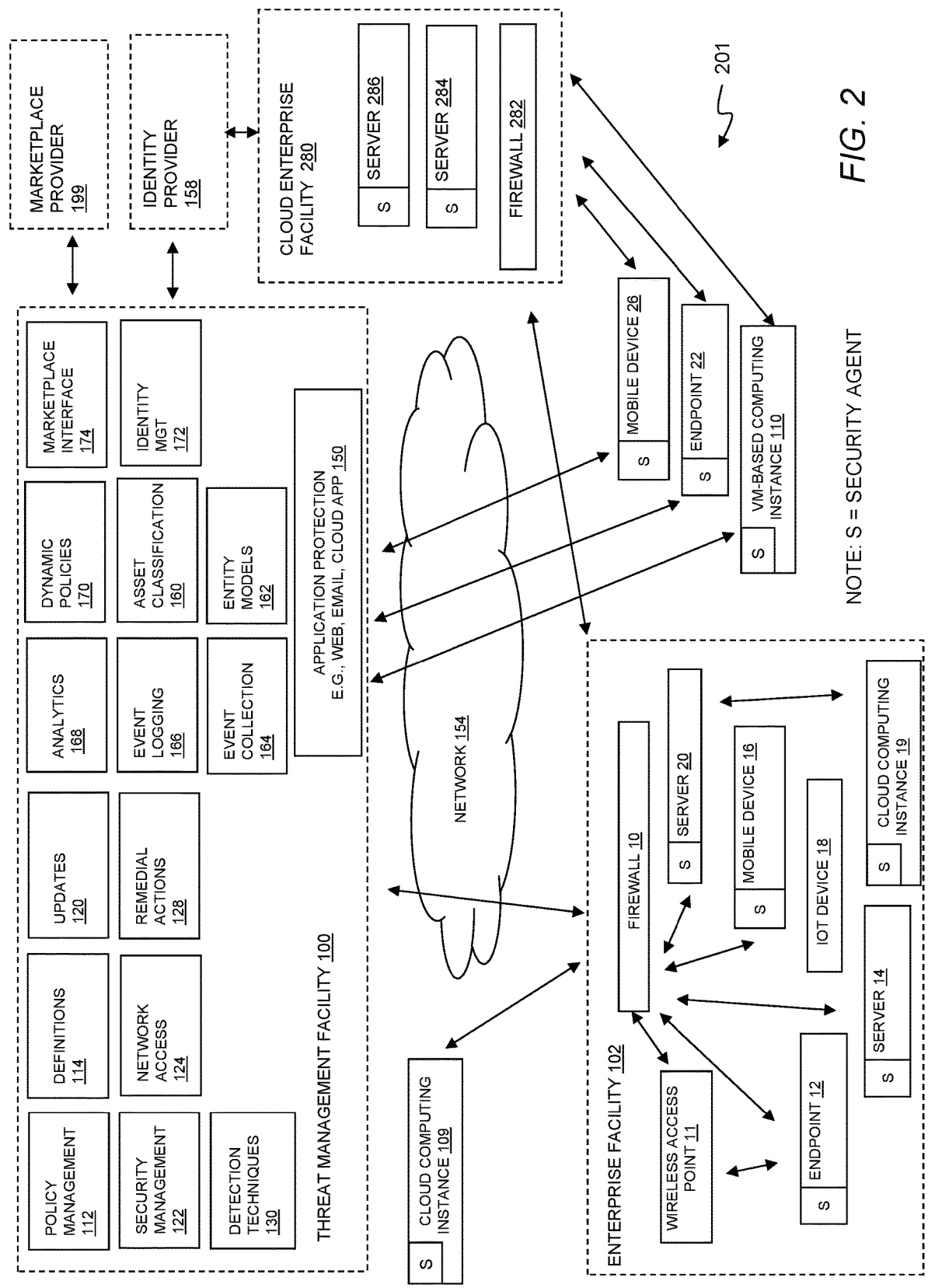
FIG. 2 depicts a block diagram of a threat management system, according to example embodiments.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26, 109, and 110. It may be understood that there may be any number of servers 284, 286 and firewalls 282, as well as other compute instances in a given cloud enterprise facility 280. It also may be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

A network security architecture with centralized threat management for an enterprise network may be deployed as a cloud-based resource. The architecture may be configured to provide security services for physical and/or logical endpoints independent of whether or not a cloud domain of the centralized threat management is distinct from a cloud domain of one or more of the endpoints, including virtual machines deployed in a virtualized desktop infrastructure (VDI). A pool of virtual machines may be configured so that each instance when activated by a user login performs a registration process with the centralized threat management facility to become a managed endpoint. The network security architecture may maintain a directory of endpoints. The directory of endpoints may optionally include a cache, cache plus directory, set of records, set of records of virtual machine identifiers, and the like for which security services are being provided. This directory may include a network session token that is assigned to an endpoint contemporaneously with initiation of network security services. Over time, this directory, or set of managed endpoint records, may become populated with duplicate entries for a single endpoint. These duplicate entries may be a result of inconsistencies between the status of an endpoint in the environment in which the endpoint is operating (e.g., the virtualized desktop infrastructure) and the centralized threat management facility. Due at least in part to operational independence of the virtualized desktop infrastructure and the centralized threat management facility, the virtualized environment may be unaware that one of its virtual machines is participating in the enterprise network and being provided network security services from the centralized threat management platform. In addition to managing virtual machines that are registered with the centralized threat management facility, the VDI may manage one or more instantiated virtual machines that are unaffiliated with the enterprise network. Therefore, virtual machine instance management actions of the VDI (e.g., initiating an instance, shredding an instance, and the like) may be based on a set of rules that are independent of rules by which the centralized threat management facility handles endpoints, including virtual machines of the VDI. Without a virtual machine providing notification of a status (e.g., termination in the VDI) to the enterprise network, an entry in the directory of managed endpoints (e.g., including an endpoint identifier and a session token) may be maintained by the centralized threat management facility after a VDI has terminated such an instance. When a user of a shredded virtual machine instance activates a new instance in the virtualized environment and joins the enterprise network, both the shredded instance and the new instance may appear in the directory of managed endpoints. Further, user behavior, such as initiating multiple instances of a virtualized machine in the VDI, which may optionally be permitted and/or managed by the VDI, may contribute to duplicate entries in the directory of managed endpoints on the centralized threat management facility. Over time, this directory of managed endpoints may become overwhelmed or otherwise burdened with duplicate entries. This situation may be exacerbated due to the number of concurrently managed endpoints being in the millions of endpoints.

Managing the directory of managed endpoints may be enhanced and delivery of security services may be improved through the methods and system of duplicate managed endpoint detection and remediation that are described herein. These methods and systems may improve performance of the computing devices (e.g., network servers and the like) that provide the security services by reducing, for example, computational resources and computer storage required to provide security services to an enterprise network. Further, detection and remediation of duplicate endpoints may reduce risks of operational errors that may expose vulnerabilities due to such duplicate entries appearing in the directory.

As noted, the network security architecture with centralized threat management for an enterprise network may preferably remain independent of an endpoint operating environment (e.g., a VDI and the like) for the endpoints for which it manages network security services as endpoints in an enterprise network. This independence may enable different enterprise network clients, or indeed a single client of the network security architecture to seamlessly use different virtualization platforms.

Clients of the network security architecture (e.g., a client administrator) may configure a plurality of virtual machine images based on one or more templates that are recorded with the network security architecture as client-specific virtual machine templates. A template may optionally include or reference network security architecture features. Among other things, a template may facilitate identifying to the network security architecture that an activated instance of a virtual machine is associated with a security service client. However, each virtual machine instance of an image generated from a template may report the same endpoint ID when initially communicating over the network. An administrator (e.g., a network security architecture client) may configure a plurality of virtual machine images based on different templates (e.g., to provide different services, such as time-keeping services, email-client services, role-based services, and the like). Each different template may be identified by an identifier (e.g., a name) shared between an administrator for the client and the network services architecture including the centralized threat management facility. In example embodiments, each template may be given a unique endpoint ID value through a template registration process. This endpoint ID may be used when a virtualized compute instance requests threat management services as an endpoint of the enterprise network. Therefore, while two compute instances from two different templates may report different endpoint IDs, each time a virtual machine from a single template requests services on the enterprise network it will, at least initially, share an endpoint ID with all other endpoints from the same template.

Figure 3:
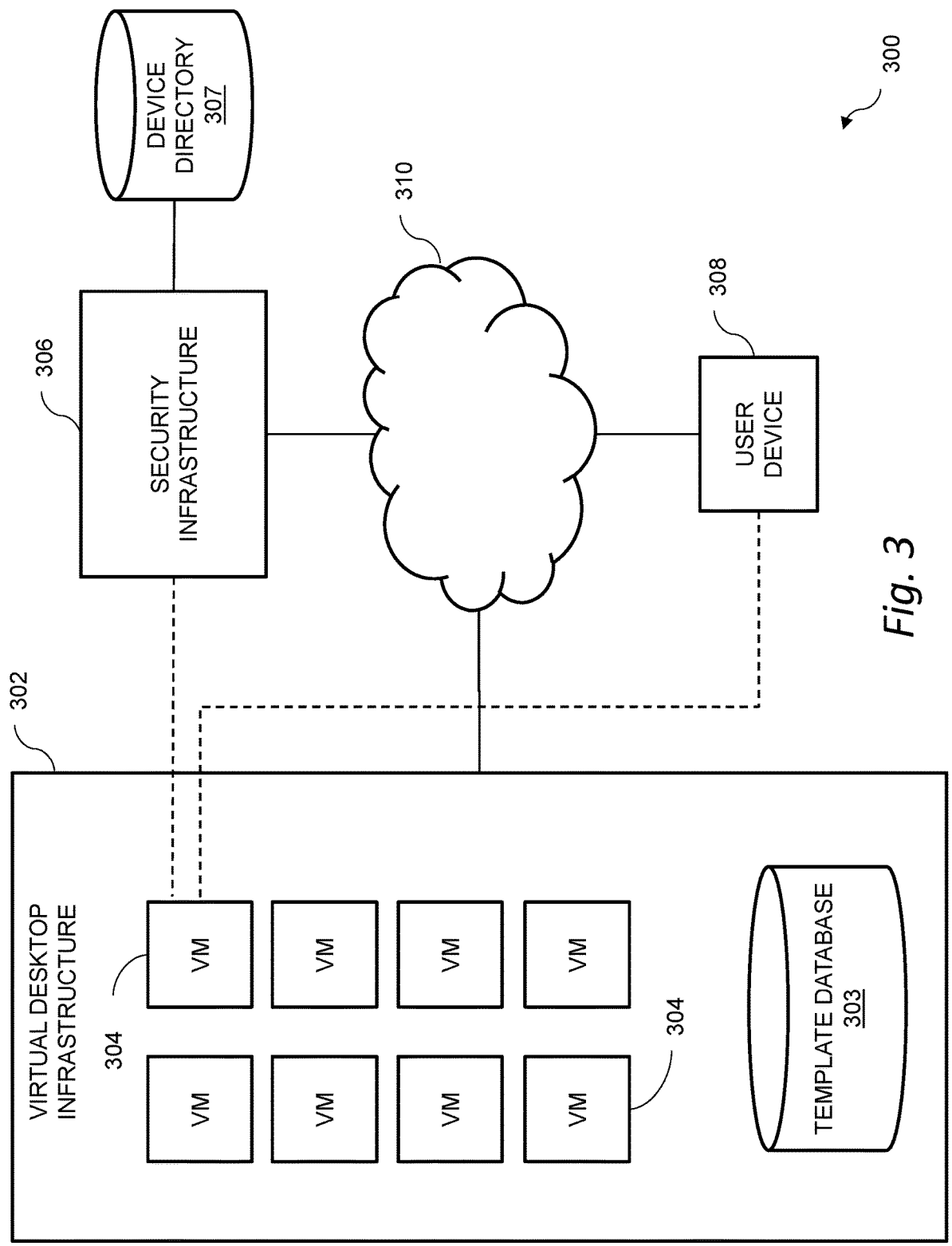
FIG. 3 shows a system for managing security for a number of virtual machines, according to example embodiments.

FIG. 3 shows a system 300 for managing security for a plurality of virtual machines. In general, a virtual desktop infrastructure 302 (also referred to herein as a virtualization platform) may include a number of virtual machines 304 where, at least a portion of which, may receive security services from a security infrastructure 306 such as any of the threat management facilities described herein. A virtual machine 304 that receives security services from the security infrastructure 306 may be comparable to a virtual machine-based compute instance 110 depicted in FIGS. 1 and 2 and described herein. The security infrastructure 306 may include aspects of the threat management facility 100 depicted in FIGS. 1 and 2 and described herein. In one aspect where the security infrastructure 306 is cloud-based, the security infrastructure 306 may be hosted in a first cloud computing domain while the virtualization platform is hosted in a second cloud computing domain. In this configuration, or if the security infrastructure 306 is more generally external to the second cloud computing domain of the virtualization platform, such that, for example, the security infrastructure 306 is not programmatically coupled to the virtual desktop infrastructure 302, the security infrastructure 306 may receive notifications of virtual machines 304 being created and/or terminated from local security agents executing on the virtual machines 304. Thus, as generally noted above, the security infrastructure 306 may accumulate endpoint records that do not correspond to any virtual machines 304 currently executing on the virtual desktop infrastructure 302, a problem that can be addressed using the techniques described herein.

The virtual desktop infrastructure 302 may be any virtualization platform or other cloud computing platform or resource suitable for creating individual machine instances as requested or required by users, e.g., of an enterprise managed by the security infrastructure 306. Thus, while the acronym for virtual desktop infrastructure, VDI, is commonly associated with Microsoft's virtualization environment, the term "virtual desktop infrastructure" and the acronym "VDI" are intended to refer more generally to any virtualization platform or technology suitable for instantiating desktops or other compute instances or end-user computing resources for users of an enterprise network, including technologies based on various server or workstation operating systems and various remote display protocols for carrying session data between a client and the virtualized computing resource. In general, a user may access the virtual desktop infrastructure 302, e.g., using a Uniform Resource Locator (URL) input to a web browser, or any other suitable local user interface. Upon user authentication to the virtual desktop infrastructure 302, the user may be directed to an instance of a virtual machine 304 created for the user, or, where multiple machine types or instances are available to a resource for selecting, configuring, or otherwise instantiating a virtual machine 304 within the virtual desktop infrastructure 302.

Each virtual machine 304 may be an instance of a computing device created by the virtual desktop infrastructure 302 for use as a virtual desktop by a user. Each virtual machine 304 may be created using a template or other model stored in a template database 303. The template database 303 may be organized to facilitate access to a template, such as a machine image of a compute instance for an enterprise that is associated with the user. For example, the template may specify (virtual) hardware features for a virtual machine 304, an operating system, virtual peripherals, installed software, and so forth. In one aspect, each template includes a local security agent configured to manage security on the virtual machine 304 in communication with the security infrastructure 306 for an enterprise. Templates may generally be configured by an administrator for the enterprise based on enterprise requirements for computing capability, application resources, security, and so forth. In one aspect, an enterprise may maintain multiple templates having different configurations for different categories of users. This may be based on computing needs, data needs, and so forth. For example, engineers may have significantly different computing needs and access privileges than human resources personnel, customer service representatives, IT administrators, and so forth. Each role in the enterprise may thus have a suitably configured template for virtual machines 304.

A security infrastructure 306, such as any of the threat management facilities 100 described herein, may manage security services for virtual machines 304 associated with an enterprise. Each time a virtual machine 304 is created by the virtual desktop infrastructure 302, the virtual machine 304 may request management services from the security infrastructure 306 in order to receive security services and support policy management, security updates, and so forth. During the management request process, the security infrastructure 306 may create a record for the requesting virtual machine 304, e.g., in a directory 307 of managed devices. The security infrastructure 306 may create a session token for use by the virtual machine 304 during subsequent communications with the security infrastructure 306. In one aspect, the directory 307 may usefully store a combination of a template identifier (based on the corresponding template used to create a virtual machine 304), an endpoint identifier (ID) configured during a process by which the template is used to generate and register a virtual machine image with the security infrastructure 306, and a user identifier (based on the user requesting a virtual machine) so that each user/machine pair can be uniquely identified within the directory. The directory 307 may include a cache storing a portion of an endpoint record, such as the session token and endpoint identifier. This cache may be used when requests for service from endpoints are received by the security infrastructure 306, for rapidly detecting if the requesting endpoint may be serviced under an existing session token or if a new session token may be created, and the like.

A user device 308 such as a physical desktop device or other endpoint or compute instance may be operated by a user in order to access the virtual desktop infrastructure 302 and create and/or access a virtual machine 304. The user device 308 may be a laptop computer, desktop computer, tablet, smart phone, or any other device generally including a processor, a display, a memory, and other hardware for providing a user interface to the user and displaying a desktop for the virtual machine 304 created for the user. The user device 308 may also or instead include a virtual device hosted on any suitable virtualization platform.

Communications among the user device 308, a virtual machine 304 of the virtual desktop infrastructure 302, and the security infrastructure 306 may occur through a network 310, such as the Internet or any other private data network, public data network, inter-network of networks, or the like.

Figure 4:
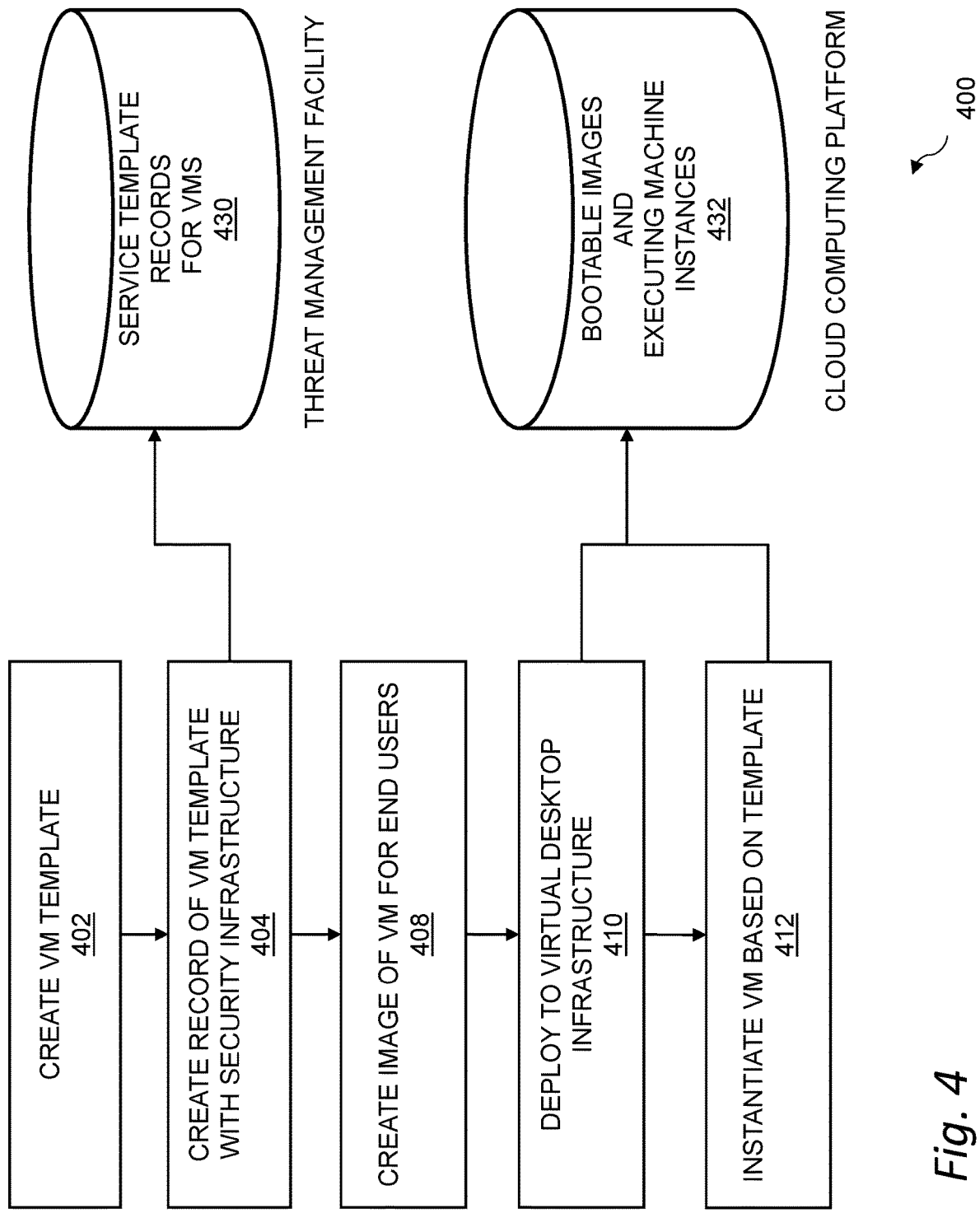
FIG. 4 illustrates a method, in accordance with example embodiments, for configuring a virtual machine template.

FIG. 4 illustrates a method 400, in accordance with example embodiments, for configuring a virtual machine template. The method 400 may be performed by one or more of the systems or components illustrated in FIGS. 1-3 and is discussed by way of reference thereto.

An administrator, such as an enterprise network administrator, may configure one or more templates specifying virtual machine images suitable for creating virtual machines on demand for enterprise users, e.g., within a virtual desktop infrastructure. In general, each template may be configured with any hardware, an operating system, software, network interfaces, and the like for an intended user and function. Each virtual machine image may also usefully incorporate a local security agent for managing security in cooperation with a security infrastructure such as any of the threat management facilities described herein.

As shown in step 402, a client administrator may create template for a virtual machine, e.g., by creating and configuring a machine for use by enterprise users on a virtual desktop infrastructure. The virtual machine image specified by this template may include a local security agent installed on the virtual machine in order to receive network security services from a remote threat management facility. An enterprise may have multiple templates, e.g., for different individuals or user types, and the administrator may share an identifier of each configuration and/or version of a template (also referred to herein as a "service template") with the network security services platform such as a threat management facility. This may include service templates for user types (admin, executive, senior executive, legal, engineering, financial, staff, etc.) or organization categories (marketing, accounting, legal, human resources, etc.).

As shown in step 404, an administrator who has created a template may store a record of the template in a directory 430 of deployed service templates maintained, e.g., by the threat management facility 100 or other security infrastructure for the enterprise. More generally, the directory 430 may be accessible to computing resources of the network security services architecture for use in managing security for the enterprise. It will be understood that any number of templates may be created and stored in this manner.

As shown in step 408, the administrator may also create an image of the virtual machine specified by the template such as a bootable disk image that can be instantiated in the virtual desktop infrastructure when requested by a user. In one aspect, the template may also specify software installation, updates, or changes to be performed after boot. In another aspect, software may be installed, updated, or modified, e.g., as part of registering a device with the centralized threat management facility. In another aspect, an administrator may launch the image, install any desired updates or the like, and then store the updated machine as a new image for use by enterprise users. In yet another aspect, the administrator may configure the new image with a software update pause parameter (and/or software to configure an update pause parameter) that indicates to a software update facility to pause updates for endpoints instantiated from the software template. This software update pause parameter may be applied during an update software workflow, as may be described herein, such as in association with FIGS. 9-12. In example embodiments, creating a virtual machine image at step 408 may include automatically configuring a corresponding software update pause parameter.

As shown in step 410, the template and/or the machine image associated with the template may be deployed by the administrator to a virtualized desktop infrastructure (VDI) to enable on-demand use of multiple instances of the created virtual machine image, e.g., by uploading the template(s) to a data store 432 for the virtual desktop infrastructure. The data store 432 may include bootable images, and/or machine instances. The virtualization platform may then manage deployment of machine instances in response to requests from end users.

As shown in step 412, users associated with the enterprise may request a virtual machine through the virtual desktop infrastructure, in response to which the VDI may retrieve a corresponding template suitable for the user and instantiate a virtual machine on the VDI. Each virtual machine associated with the enterprise may subscribe to the centralized threat management facility for providing network security services. As such, when a virtual machine is instantiated, the machine will seek to establish a network security services session with the threat management facility 100, e.g., before the user is permitted to log on to the machine or before the user is granted access to managed data sources, applications, or other enterprise resources.

Figure 5:
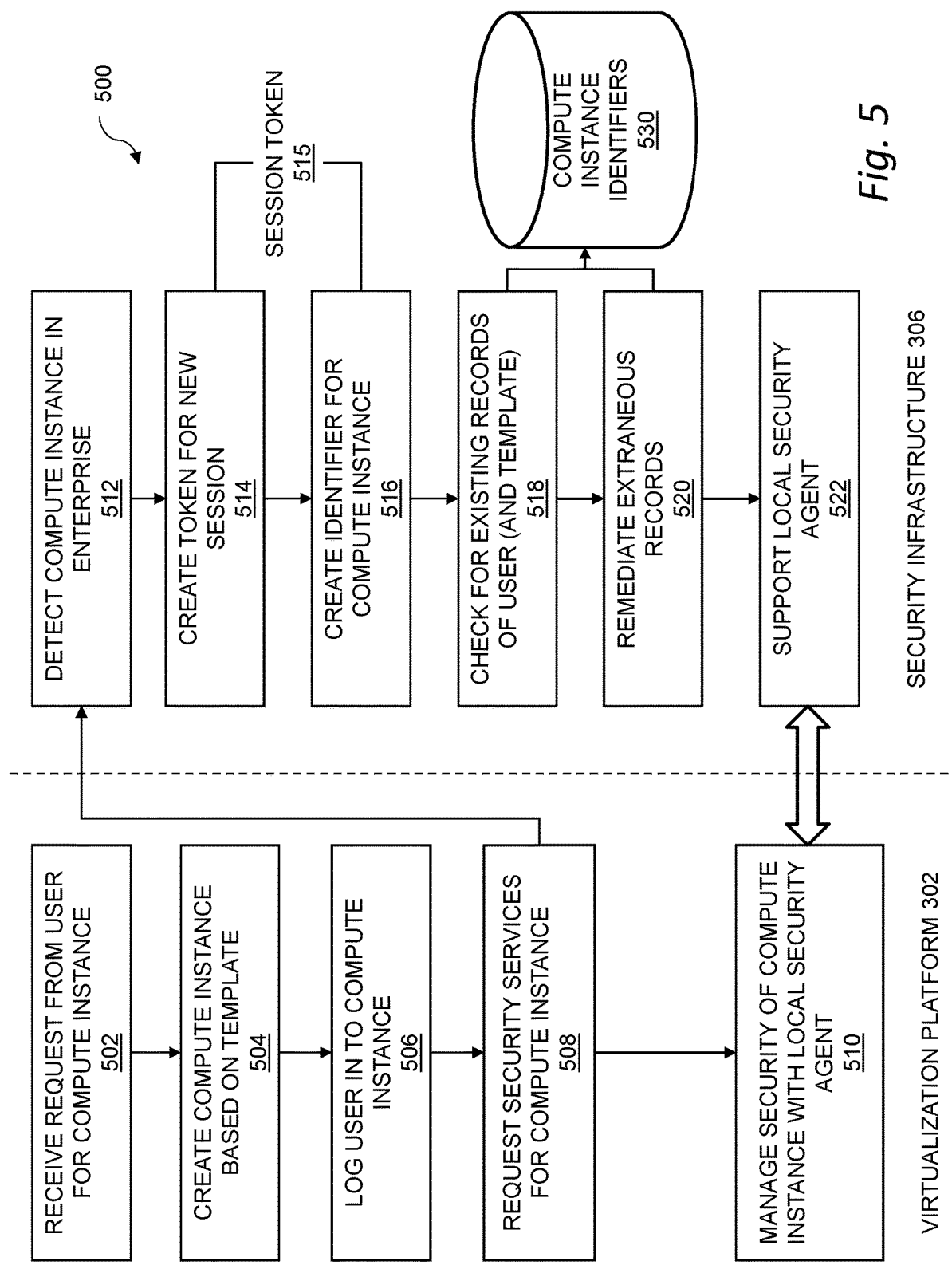
FIG. 5 illustrates a process, in accordance with example embodiments, for managing security for virtual machines

FIG. 5 illustrates a method 500, in accordance with example embodiments, for managing security for virtual machines from a security infrastructure external to the virtualization environment for the virtual machines. The method 500 may be performed by one or more of the systems or components illustrated in FIGS. 1-3 and is discussed by way of reference thereto.

It will be understood that terms such as "duplicate endpoints," "duplicate compute instances," and the like, as used herein, are intended to refer to duplicate records of an end user compute instance maintained by the security infrastructure rather than multiple instances of a single compute instance executing within the virtualization environment. In general, these duplicate compute instance records will arise when an end user launches a virtual machine while a previous instance of a virtual machine for the end user has established a network security services session with the threat management facility 100 for providing security services. It will also be understood that terms such as "endpoint," "virtual machine," and "compute instance," are generally used interchangeably herein, unless explicitly noted otherwise (for example when referring to a physical endpoint or device to distinguish from a virtual machine). Further, operational steps depicted on the left side of the vertical line of FIG. 5 may be performed by computing resources of or associated with the virtualization platform 302. Operational steps depicted on the right side of the center line of FIG. 5 may be performed by computing resources associated with the security infrastructure 306. Yet further, the virtualization platform 302 and the security infrastructure 306 may be disposed in distinct cloud processing environments.

As shown in step 502, the method 500 may begin when a user requests use of a compute instance on a virtualization platform, such as a virtualized desktop infrastructure. The user may be a user of an enterprise network, e.g., with a pre-existing user profile including a name, authentication credentials, an enterprise role, a security policy, an access control list, and so forth. The user may request a compute instance, which may be created for the user with the virtualization platform according to a specific user profile, user enterprise role, or the like. This may, for example, include a compute instance that meets a particular operational criteria or organizational function of the user, such as providing access to one or more services of the enterprise network, one or more external services authorized by the enterprise network, or some combination of these or other software requirements, computational requirements, data storage requirements, access requirements, and so forth. Thus in one aspect, the virtualization platform may manage a number of different virtual machine configurations for an enterprise. In another aspect, the virtualization platform may more generally maintain a pool of compute instances that are allocatable to the enterprise. For example, an enterprise may be licensed for fifty concurrent virtual machines, and the virtualization platform may ensure that the enterprise does not exceed this limit or provide mechanisms for requesting administrative authorization for additional machines and/or charge additional fees for additional machines. In order to maintain the enterprise within a limited pool of computing resources, the virtualization platform may also terminate machines under a variety of conditions, e.g., when a machine is non-responsive or when a machine is idle for a period of time beyond some threshold.

Where multiple machine configurations are supported, a user may explicitly select a machine type, or a machine type may automatically be selected from a number of templates maintained for the enterprise. Each machine image associated with a template may include a local security agent installed on the virtual machine and configured to execute when the virtual machine boots, causing the newly booted machine to request management from a security infrastructure such as a centralized threat management facility 100 and the like.

As shown in step 504, once a template including a machine image is selected, the virtualization platform may create a compute instance based on the template. This may include allocating the compute instance from a pool of machines available for users from the enterprise and booting a virtual compute instance based on the machine image on the virtualization platform. In general, the virtualization platform may assign a unique compute instance identifier, such as a serial number, instance sequence number, or other machine identifier that facilitates uniquely identifying the compute instance within the virtualization infrastructure. The machine identifier may be visible to applications and processes executing on the compute instance, such as a local security agent or other process on the virtual machine that requests to join the enterprise network and/or requests enterprise network services such as security services provided by the security infrastructure 306 that may be embodied as the threat management facility 100 of the enterprise network.

As shown in step 506, the user may log in to the created compute instance. This may, for example, include a user interaction with a user interface of the virtual machine rendered on a physical device operated by the user. The user may, for example, provide login credentials such as a username, a password, and, where required by the enterprise security policy, one or more other authentication factors such as a hardware or software token from another device, a biometric identifier, or the like. Once the user successfully authenticates, the machine may launch any installed start-up applications, processes, services, and the like. For example, the virtual machine may, upon start-up, automatically launch a local security agent that provides security services to the virtual machine in cooperation with a threat management facility for an enterprise associated with the template from which the compute instance is created in step 504. The virtual machine may also or instead request updates from the threat management facility 100 and/or third-party software providers.

As shown in step 508, the virtual machine may request security services. This may, for example, include a request from a local security agent or other security process on the virtual machine to initiate a security management session with a security infrastructure 306 resource such as a threat management facility 100. The request may include information that facilitates uniquely identifying the compute instance on the enterprise network, such as a user identifier (e.g., username, user ID number, etc.), a machine fingerprint derived from machine characteristics, a machine identifier assigned by the virtualization platform, and/or any other identifiers for uniquely identifying the virtual machine instantiated by the virtualization platform. The request may include information that facilitates identifying a context of the compute instance, such as an identifier associated with a template on which the virtual machine is based. Examples of an identifier associated with a template may include a name of the template, an endpoint identifier ID assigned to the template when the template was created and initially registered with a threat management facility as depicted in step 404 of FIG. 4, and the like. While the request for security services may be explicitly initiated by a local security agent or similar process executing on the virtual machine, it will be understood that other techniques may also or instead be used to explicitly or implicitly notify a security infrastructure 306 of the presence of the new device in the enterprise network. These other techniques may include receiving and responding to a request to manage security for the virtual machine, such as from the threat management facility 100. For example, upon user login, the compute instance may request software updates from resources of the enterprise network, which may in turn be used to detect a new compute instance for which security is to be managed. In this latter case, the threat management facility 100 handling security for the enterprise network that the compute instance has joined may initiate a responsive request to the compute instance to connect to a local security agent and manage security for the compute instance. Although requesting security services for the compute instance in step 508 is depicted as following a user logging on to the compute instance in step 506, a request for security services for the compute instance may be initiated after a compute instance is instantiated but prior to a user logging on to the compute instance. In such a case, information provided in the initial request may not initially include a user identifier, although this information may usefully be provided later to support deduplication of records as described herein.

As shown in step 510, the local security agent may manage at least a portion of security of the virtual machine. After a launch of the security agent (e.g., on startup) and registration with the threat management facility 100 using any suitable manual, automatic, or semi-automatic registration protocol, the security agent may cooperate with the remote threat management facility 100 to manage security for the compute instance. This may, for example, include receiving updates such as security policy changes, updates to permissions, updates to software (e.g., with security patches or the like), updates to malware definitions and virus signatures, changes to instrumentation or other threat detection tools on the compute instance, certificate updates, and so forth. This may also include any of the threat detection techniques described herein, which may be performed locally, remotely (e.g., at the threat management facility 100), or some combination of these. This may also or instead include remediation of the compute instance when a threat is detected, e.g., using any of the remediation techniques described herein or any other suitable remediation techniques. By way of example and not limitation, this may include performing malware scans, patching/updating software, quarantining, restricting usage of network resources, restarting the compute instance, and so forth.

As shown in step 512, the threat management facility 100 may detect that a compute instance has been activated on the enterprise network, for example, by receiving a request to join the enterprise network and/or by receiving a request for providing security management services from a compute instance during startup as illustrated in step 508. Detecting a compute instance may include receiving compute instance identification information, such as a user identifier (e.g., user name, login, associated password, login credentials, biometric factor, hardware or software token, and the like), a machine identifier (e.g., a machine fingerprint, a unique machine identifier assigned by the virtualization platform, or the like), a template or image identifier that specifies an image used by the virtualization platform to create the compute instance, an endpoint identifier configured into the virtual machine through the template, and so forth. For a virtual machine, such as one of the virtual compute instances of a virtualized desktop infrastructure, compute instance identification information may include, among other things, a description of the compute instance configuration, such as a description of services offered on the compute instance and/or a name of a template for a bootable image used to instantiate the compute instance.

It will be understood that, while the discussion emphasizes management of security for virtual machines hosted in a cloud-based virtualization platform, security infrastructure 306 may also or instead manage physical devices and/or devices instantiated by individual users on private clouds. However, physical devices will generally have consistent machine identifiers that can be tracked by a security infrastructure 306, such as the threat management facility 100 and the like. Thus the techniques described herein can be particularly advantageous in contexts such as cloud-based virtualization where user activity may result in a sequence of multiple compute instances having identical or nearly identical machine identifiers and/or users. For example, a virtualization environment may be specifically designed to tear down compute instances when a user connection is broken, e.g., in order to conserve the pool of available machines allocated to a customer. In this environment, a user may generate multiple instances of a machine simply due to a poor network connection or intermittent work interruptions by the user.

As shown in step 514, the threat management facility 100 may create a session token 515 to identify a network session for a compute instance. The session token 515 may be shared with the compute instance so that future communications with the compute instance may be associated with the network session initiated for the compute instance. As described herein, this may also be useful when determining if the compute instance of the current network session is a duplicate of an earlier network session being managed by the threat management facility 100.

As shown in step 516, an identifier for the compute instance may be created for use by the threat management facility 100. The identifier may be based on a combination of one or more of a user identification data associated with the user who logged in to the compute instance (e.g. as shown in step 506), the session token created for the current network session with the compute instance (e.g., as shown in step 514), compute instance identification data such as a machine fingerprint or a machine identifier assignment by the virtualization platform and received by the threat management facility 100 when the compute instance requests to join the enterprise network, identification data for a template on which the virtual machine instance is based, endpoint identifier ID provided by the threat management facility 100 during a registration process of the virtual machine image, and the like. The user identification information may include a username, associated password, login authorization from the enterprise network, token or the like from an identity provider, and the like. In general, user identification may uniquely identify the user within the enterprise network.

As used herein, the term "virtual machine identifier" is intended to refer to any or all such identifiers, including identifiers created for a machine (such as a random and/or unique identifier), identifiers derived from machine information (such as a hash of available machine data), or information including machine information (such as a concatenation of a user identifier and a template identifier), or any suitable combination of these. Such a machine identifier may more generally identify and/or encode information about a compute instance created by the virtualization platform.

In one aspect, an enterprise network may support the same user logged in to multiple distinct compute instances, such as compute instances generated from different templates. In this case, two or more compute instances from distinct service templates in the enterprise network may be concurrently associated with a single user, and additional handling may be provided to ensure that the user is able to use two or more compute instances concurrently, while also ensuring that each corresponding record at the threat management facility 100 is deduplicated if/when appropriate. For example, the identifier for each compute instance may include a template identifier that identifies a specific template that is (a) selected from two or more templates of machine images available to the enterprise and (b) used to create the compute instance currently interacting with the threat management facility 100. More generally, the identifier created by the threat management facility 100 may include any information suitable for uniquely identifying a user/machine pair within the enterprise network and the virtualization platform.

Creating the identifier as shown in step 516 may include validating information for the compute instance used to create the compute instance identifier, such as the name of a template, a username, a machine identifier (e.g., to ensure that it conforms to a numbering protocol used by a virtualization platform), and so forth.

As shown in step 518, the method 500 may include checking for existing records of one or more of a user and machine, e.g., in a directory 530 of compute instance identifiers. This may include checking new records as they are created by requests from new compute instances, or this may include automatically adding each record without checking if the new record is a duplicate and then searching for duplicates (e.g., with a regularly operating background process) in the directory 530. In one aspect, each newly created identifier may be compared against entries currently in the directory 530, such as by comparing user identification data, compute instance identification data, or a combination of these identifiers and/or other information useful for distinguishing duplicative records of enterprise endpoints. For high volume implementations, a hash, bloom filter, or other technique(s) may be used for quick comparisons to data in the directory 530. In another aspect, physical devices may be detected (e.g., based on whether a compute instance identifier corresponds to a virtual desktop infrastructure) and tagged, sorted, or otherwise alternatively processed to require less frequent deduplication checks. This may advantageously reduce processing of records for endpoints that are expected to remain relatively stable within the enterprise.

As shown in step 520, when duplicate records are identified in the directory 530, such as two or more records that appear to be for a single user and compute instance, or are generated for two compute instances of a single virtual machine image, one or more remedial actions may be taken. This may, for example, include deduplicating the records by removing an older one of the duplicate records. Where total usage time of a compute instance can usefully be tracked, this may instead include removing a newer one of the duplicate records (e.g., so that the age of the compute instance more closely corresponds to the total connection time for the compute instance). This may also include deleting any historical data of a network session of the removed entry, or storing the historical data in a separate data store, e.g., for forensic use, audit trails, and the like. In one aspect, deduplication may include merging network session records into a combined network session associated with the new network session token 515 or a previous session token. Deduplication may instead include assigning the new session token 515 to one or more existing endpoint session records, effectively replacing the existing endpoint session token with the new session token. Deduplication may also or instead include merging and/or storing security data and activity for deduplicated compute instances in order to preserve user history for the compute instance and/or session.

In general, steps 518 and 520 (detection and remediation) may be performed as a sequential pair for each duplicate that is detected, or these steps may be performed as separate processes executing independently. That is, in one aspect, the entire directory 530 may be checked as a batch process, and then duplicate entries can be addressed in a second batch process, or each detection may be immediately addressed as it is detected, or some combination of these. In another aspect, remediation may be based on other conditions, such as a total count of entries in the managed compute instance directory 530, an accumulated count of duplicate entries, a rate of detection of new compute instances on the enterprise network, information descriptive of one or more virtualization desktop infrastructure providers (e.g., does the VDI provider signal to the threat management facility 100 when compute instances that it manages are shredded), a variable remediation criteria provided to the threat management facility 100, current computation load on the threat management facility 100, and so forth, as well as combinations of the foregoing.

As shown in step 522, the threat management facility 100 may support the local security agent executing on the compute instance. This support may begin before, during, or after deduplication. For example, checking for duplicate records of a compute instance associated with a new session token 515 and remediating extraneous records may be performed after the threat management facility 100 initiates management of security for the compute instance. In general, the threat management facility 100 may support security for the compute instance using any of the techniques described herein, including, e.g., providing updates to software, malware definitions, security policies, drivers, and so forth. Security functions of the threat management facility 100 may also or instead include receiving event data from the local security agent on a compute instance and analyzing the event data at the threat management facility 100 for possible malicious activity.

Figure 6:
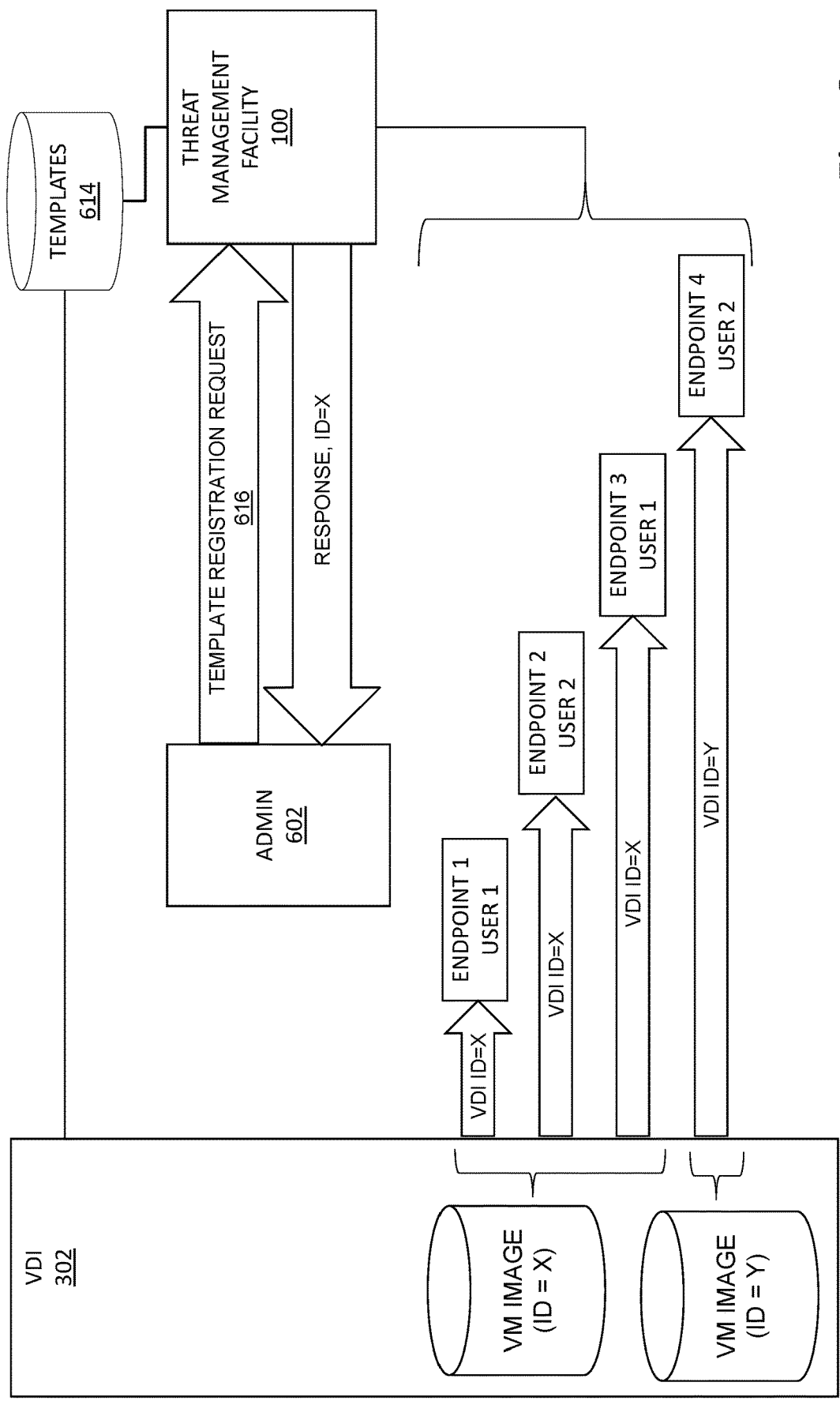
FIG. 6 shows a process, in accordance with example embodiments, for registering machines for security services.

FIG. 6 shows a process for registering machines for security services in accordance with example embodiments. The process for registering machines depicted in FIG. 6 may be performed by one or more of the systems or components illustrated in, for example FIG. 3 and is discussed by way of reference thereto. In general, an administrator or other authorized user may configure a template for a bootable image from an administrator endpoint 602. The administrator endpoint 602 may register the use of a particular services template with the threat management facility 100 using a template registration request 616 to record the template in a list of deployed templates 614 for an enterprise network. The threat management facility 100 may respond to the template registration request with a confirmatory HTTP response and optional endpoint identifier for uniquely identifying a virtual machine instance within the enterprise network (e.g., ID=X, ID=Y, etc.). After registering the template, or optionally registering a machine image based on the template, the administrator endpoint (or the threat management facility 100 or other resource) may interact with a virtualized desktop infrastructure 302 to provide template and/or machine image information for use in provisioning compute instances based on a bootable image.

The virtual desktop infrastructure 302 may, in turn, receive requests to provision compute instances from enterprise users. In response to user requests, the virtual desktop infrastructure 302 may create compute instances based on a corresponding bootable image provided by the administrator. As noted above, an enterprise may have two or more different bootable images, e.g., for different user types, and a user may be authorized to operate two or more compute instances concurrently, either of the same type or of different types. In the example of FIG. 6, four compute instances (labeled ENDPOINTs 1-4) may be provisioned to two different users (USER 1 and USER 2). As a user logs in to each compute instance, the compute instance may launch a local security agent and request services from the threat management facility 100. In this case, USER 1 initially requests and logs in to a compute instance based on template ID=X, and USER 2 also requests and logs in to a compute instance based on template ID=X. When each of these endpoints requests services from the threat management facility 100, a record may be created at the threat management facility 100 that identifies one or more of the template, the user, a machine identifier from the virtual desktop infrastructure 302, and any other information suitable for deduplicating compute instances.

Subsequent to the initiation of services with ENDPOINT 1 for USER 1, the compute instance may become disconnected or crash, and USER 1 may once again request a compute instance based on template ID=X. This may also occur where USER 1 abandons ENDPOINT 1 without closing the machine, e.g., after completing a task for which the compute instance was provisioned. Although ENDPOINT 1 is no longer in use, the virtual desktop infrastructure 302 may not be informed of this. Even where the virtual desktop infrastructure 302 terminates the machine, e.g., by timing out the machine in order to conserve a pool of compute instances for the customer, the virtual desktop infrastructure 302 may have no mechanism to report this termination to the threat management facility 100. In any of these cases, ENDPOINT 3 will be created by the virtual desktop infrastructure 302 in response to the request from USER 1 (which request may be initiated from the same physical machine that requested ENDPOINT 1), and when USER 1 logs on to ENDPOINT 3, ENDPOINT 3 will request services from the threat management facility 100. Upon identifying the user (USER 1) and template (ID=X) for ENDPOINT 3, the threat management facility 100 may check the directory of registered endpoints and/or the cached portion thereof for an existing record or cache entry that suggests one or more of the combination of ID and user is already under management by the threat management facility 100. As an example, unless a user is permitted by the enterprise to concurrently operate two compute instances from a single template, the threat management facility 100 may deem a second endpoint (e.g., ENDPOINT 3) for USER 1 to be duplicate of the first such entry (ENDPOINT 1/USER 1). In this case, the threat management facility 100 may remediate the duplicate endpoints (ENDPOINT 1 and ENDPOINT 3) by deleting one of the entries and/or merging the entries into a single record with a single session token.

Subsequent to the initiation of services with ENDPOINT 2 for USER 2, the user may request an additional compute instance based on a different template, ID=Y, e.g., for performing different computing tasks from the same terminal operated by the user. In this case, the virtual desktop infrastructure 302 may responsively instantiate ENDPOINT 4, and when USER 2 logs on to ENDPOINT 4, the compute instance may request services from the threat management facility 100. In this case, the threat management facility 100 may compare the user and template for ENDPOINT 4 and, not finding a match (because USER 2's other compute instance was created from a different template), will add a record for ENDPOINT 4 to the directory of managed devices maintained by the threat management facility 100. The threat management facility 100 may also or instead store a portion of the information for the endpoint in an endpoint session token cache as describe herein.

In general, any number and combination of templates, compute instances, and users may be managed in this fashion to reduce or eliminate duplicate entries for active compute instances in the directory maintained by the threat management facility 100.

Figure 7:
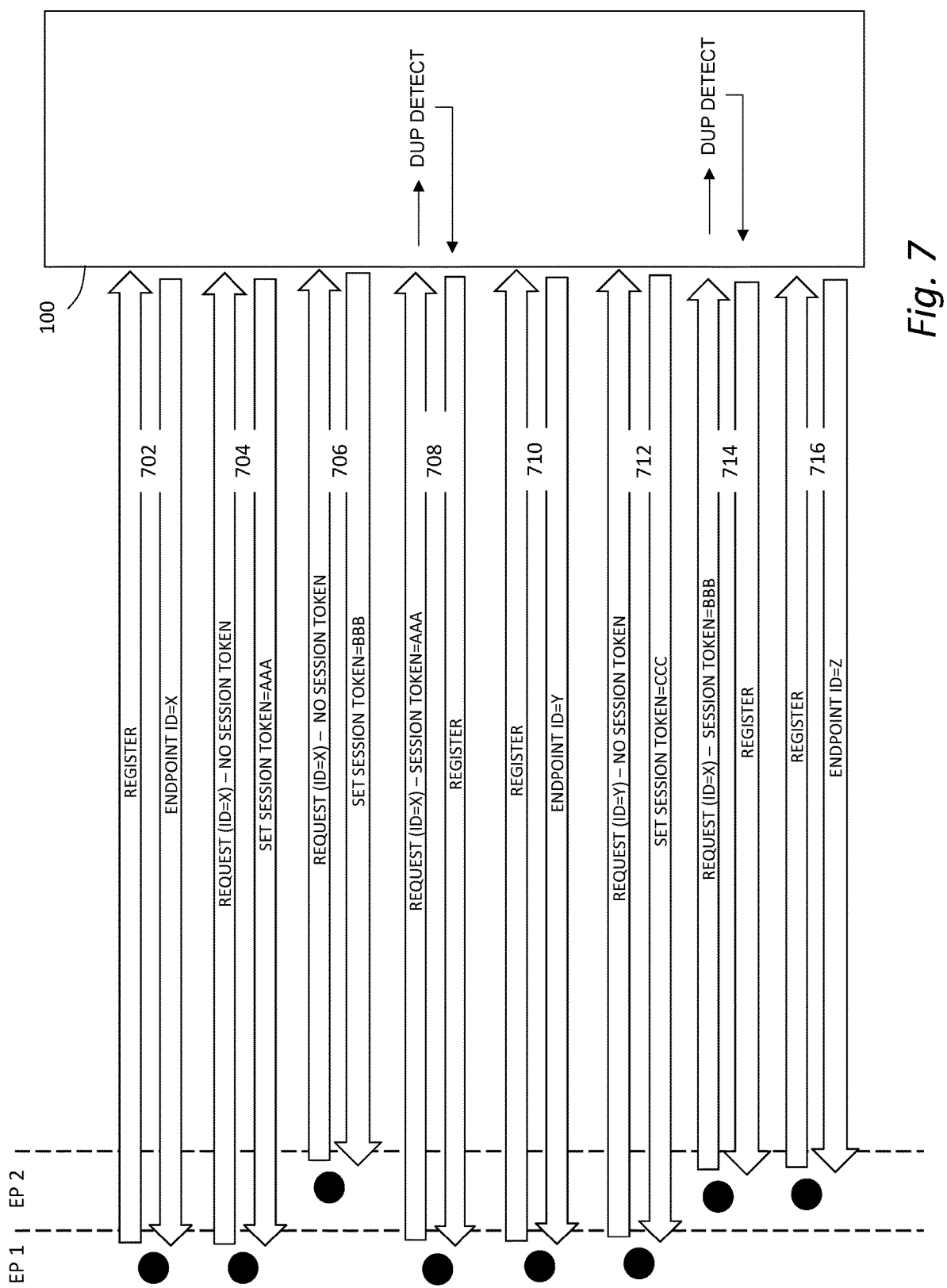
FIG. 7 illustrates examples of a number of compute instances receiving services through interactions with a threat management facility.

FIG. 7 illustrates a number of compute instances receiving services through interactions with a threat management facility in accordance with example embodiments. In general, FIG. 7 shows a threat management facility 100, configuring endpoints (e.g., EP 1 and EP 2) for management in an interaction through which the threat management facility 100 provides an endpoint identifier (e.g., ID=X and the like) in response to an endpoint registration request and assigns a session token upon initiation of a management session responsive to a request therefor from a configured endpoint. Duplicated endpoint requests, embodiments of which are described below, are resolved by the threat management facility 100 based at least in part on a context of and endpoint, such as a type of endpoint. In the embodiments represented by FIG. 7, a type of endpoint may be a physical endpoint so that endpoint EP1 may be a physically distinct machine from the machine of endpoint EP 2.

The interactions between endpoints and the threat management facility 100 may generally be HTTP exchanges. Responses from the threat management facility 100 may include an HTTP 200 response that generally indicates that the request is successful. Another type of response may include an HTTP 401 response that generally indicates the response was not completed for lack of information, such as authentication credentials and the like. An HTTP 401 response may include an attribute (e.g., a realm attribute value) that may be utilized by the recipient to address the lack of completion. As will be described below, responses in interactions 702, 704 and others may be HTTP 200 responses; responses in interaction 706 and others may be HTTP 401 responses with a REALM attribute value depicted (e.g., interaction 706 may include an HTTP 401 response with a REALM value of "REGISTER"). While the interactions between endpoints EP 1, EP 2 and the threat management facility 100 may be HTTP interactions, protocols other than HTTP may be applied to the interactions of FIGS. 7 and 8 without substantive impact on the scope of the subject matter disclosed herein.

In the embodiment of FIG. 7, device management may include a registration interaction 702 between the endpoint EP 1 and the threat management facility 100. The threat management facility 100 responds to a registration request of endpoint EP 1 by assigning an endpoint ID (e.g., ID=X). The threat management facility 100 associates registered endpoint EP 1 with endpoint ID X in an endpoint cache and/or directory.

The endpoint EP 1, now registered with the threat management facility 100 and optionally assigned endpoint ID X through the registration interaction 702, requests services through a management request interaction 704. A registered endpoint, (e.g., EP 1) requests management by including an endpoint ID (e.g., X) in the request. In general, requests from endpoints include a session token if one has been assigned. If one has not yet been assigned (as depicted in interaction 704), the request will not include a session token. The threat management facility 100 may respond with a notification that it has set a session token for this management request to a value of AAA and stored at least the session token value (AAA) associated with the endpoint ID (ID=X) in the endpoint directory. As described herein, a portion of information stored in an endpoint directory may also be stored in a cache memory that the threat management facility 100 may use, in addition to the endpoint directory, when handling certain interactions with endpoints. An entry in the endpoint directory (and/or optionally an endpoint cache) resulting from registration interaction 702 may be updated with a corresponding session token value. In this way the endpoint identifier stored in a record of the endpoint cache/directory (e.g., during interaction 702) is associated with a currently assigned session token value (e.g., produced in response to the management request of interaction 704).

Endpoints, such as physical and virtual computing instances, may be configured in a variety of ways. One such way that may induce endpoint duplication includes duplicating an existing endpoint (e.g., making a copy of a portion of an existing endpoint machine image). When an endpoint has been assigned an endpoint ID, such as by registering through registration interaction 702, duplicating the endpoint may also include copying the assigned endpoint ID. In the example of FIG. 7, endpoint EP 2 may be configured through such an endpoint duplication process. Because endpoint EP 2 is configured from a registered endpoint that has been assigned an endpoint ID, it initiates a management session request 706 with an endpoint ID (ID=X) and without a session token. While this example suggests that an endpoint ID may be copied through machine image duplication of a first registered endpoint, the methods and systems for remediation of duplicated endpoints (e.g., physical and/or virtual computing instances) may be performed independent of the process by which a second endpoint acquires an assigned endpoint ID. An exemplary scenario in which endpoint EP 2 may make the request in management interaction 706 includes a user accessing the enterprise network concurrently through two workstations, such as one in a user's office and another in a laboratory. The threat management facility 100 may respond with a notification that it has set a session token for this management request to a value of BBB and associated at least the session token value (BBB) with the endpoint ID (ID=X). The directory, which may optionally include a cache configuration, may be indexed by the endpoint IDs assigned during each registration interaction, such as registration interaction 702 in which endpoint EP 1 is assigned endpoint ID X. As a session token is assigned to a registered endpoint (as in management request interactions 704 and 706), the assigned session token may be written to an endpoint entry in the directory (or cache) that corresponds to the respective ID of the request. Therefore, during interaction 706, the session token assigned to endpoint ID X, which was previously set to AAA in interaction 704 is now set to BBB.

Although not shown in the example of FIG. 7, the threat management facility 100 may detect that the request in management interaction 706 that includes an endpoint ID (ID=X) that was previously assigned with session token AAA is a duplicated request. Such a detection may be based on a request that includes an existing endpoint ID for which the threat management facility 100 has assigned a session token, when the request includes a different (or optionally does not include) a session token. By responding to the request as depicted in interaction 706, the threat management facility 100 enables a greater range of options for handling duplicate requests, such as removing records from the endpoint directory, merging records in the endpoint directory, and the like.

When a subsequent request 708 from endpoint EP 1 that includes both ID=X and the assigned session token AAA is received, the threat management facility 100 may determine that a conflict exists at least because the current session token in the directory for endpoint ID X is BBB (from interaction 706). This conflict, which may be referred to herein as a duplicate endpoint and the like may be managed by the threat management facility 100 by responding to the endpoint EP 1 with an instruction to perform a registration interaction (e.g., as described above for interaction 702). This response may be configured as an HTTP 401 message with a REALM value of "REGISTER". The endpoint EP 1 will detect this response and perform a registration interaction 710. While specific examples of conditions (e.g., endpoint IDs, session token values, and the like) that signal detection of a duplicated endpoint request are described herein, other techniques may also or instead be used for detecting a duplicated endpoint session request, and any suitable technique may be applied instead of, in addition to, and/or independently of techniques described herein for remediating duplicated endpoint sessions, and all such techniques are intended to fall within the scope of this disclosure.

In response to the service request in management interaction 708 that includes a known endpoint ID (ID=X) and an incorrect session token (e.g., AAA rather than BBB), the threat management facility 100 may commence managing endpoints with ID=X as duplicate endpoints. An initial step in this management is to assign a new endpoint ID (ID=Y) during the registration interaction 710. This initial step creates a new entry in the endpoint directory for endpoint ID=Y. The endpoint EP 1 receives the newly assigned endpoint ID=Y and makes a management request 712 to receive a new session token value CCC. The threat management facility 100 updates the endpoint directory entry for endpoint ID=Y with the assigned session token value CCC. A result of the sequence of interactions including the response in interaction 708, the registration and ID assignment of interaction 710 and the management interaction 712, is that the directory now holds two endpoint records: (ID=X, SESSION=BBB; and ID=Y, SESSION=CCC). Further, the threat management facility 100, optionally through an annotation in a corresponding entry in the endpoint directory, identifies endpoint ID X as being duplicated (e.g., as a result of the management request 708).

When the endpoint EP 2 makes a management request 714 that includes its endpoint ID X and its assigned token session value BBB, the threat management facility 100 determines that the request is being made by a duplicated endpoint ID (in this case endpoint ID=X). The threat management facility 100, responsive to determining the duplicate status for endpoint ID=X, signals to endpoint EP 2 to perform a registration interaction 716 in which it is assigned a new endpoint ID=Z. The result of interactions 714 and 716 (and a subsequent management interaction for endpoint EP 1 that is not depicted in which the management request includes the newly assigned endpoint ID=Z and that is assigned an unused session token (e.g., DDD)) is that the endpoint directory may include three endpoint entries (ID=X, SESSION=BBB [DUP]; ID=Y, SESSION=CCC; and ID=Z, SESSION=DDD).

Management requests may fall into any of at least three categories: (i) non-duplicated, (ii) previously duplicated, and (iii) newly duplicated. Non-duplicated requests include an endpoint ID and corresponding session ID (e.g., Y and CCC) that match an entry in the endpoint directory that is not marked as duplicated. Newly duplicated requests include management requests with any existing endpoint ID (e.g., X, Y, or Z) found in the endpoint directory, but that do not include a corresponding session token. This detection is noted in response to requests in management interactions 708 and 714, for example. A previously duplicated request includes any request for management that includes an endpoint ID that has been identified as a duplicated in the endpoint directory (e.g., endpoint ID X). The threat management facility 100 may respond to newly duplicated requests and previously duplicated requests with an instruction for the requesting endpoint to register with the threat management facility 100, causing another endpoint ID to be assigned and combined with a session token. Duplicated requests may alternatively be responded to by aligning records for two sessions (e.g., merging, concatenating, relabeling, and the like records for) under one session token, such as a newly assigned session token and/or an existing session token.

Another approach to configuring endpoints is to use a common virtual machine image to deploy virtual machine instance endpoints in a virtual desktop infrastructure. However, there is a potential for generating a large number of virtual machines through reuse of a common virtual machine image. Further, virtual machines have a generally transient nature. As an example, each time a user logs out of a virtual instance endpoint (e.g., at the end of a workday) and logs in to another instance of the same virtual machine (e.g., at the start of a new workday), a new endpoint instance is detected while yesterday's endpoint instance is still present in the directory of endpoints being managed by the threat management facility 100.

Figure 8:
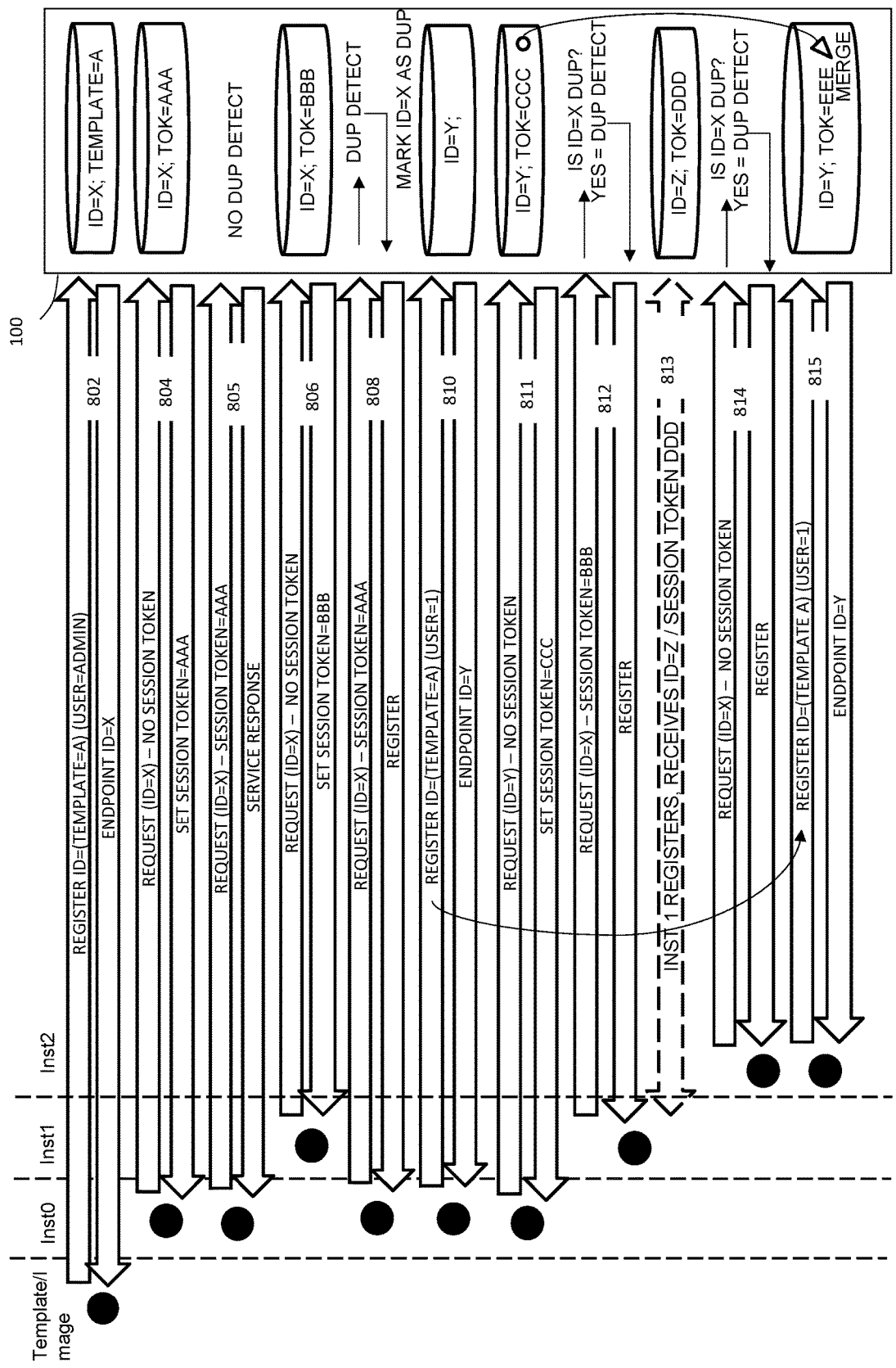
FIG. 8 illustrates examples of a number of virtual compute instances interacting with a threat management facility.

FIG. 8 illustrates a number of compute instances requesting services from a threat management facility in accordance with example embodiments. The steps in FIG. 8 attempt to resolve the proliferation of virtual machine instance endpoints that may be introduced by, among other things, application of endpoint deduplicating techniques describe for FIG. 7. In general, FIG. 8 shows a threat management facility 100, handling service requests from a plurality of virtual machine instances of a bootable image derived from a common template. Requests to the threat management facility 100 may contain information that facilitates uniquely identifying a compute instance, such as a user identifier (e.g., username, user ID number, etc.) and a machine identifier (such as a fingerprint derived from machine characteristics, a machine identifier assigned by the virtualization platform, and/or any other identifiers for uniquely identifying the virtual machine instantiated by the virtualization platform). The request may also include information that facilitates identifying a context of the compute instance, such as an endpoint identifier that is derived from the template (e.g., ID=X and/or template name) or assigned by the threat management facility 100, a network management session token and the like.

As shown in a first interaction 802, a new template ("A") may be registered with the threat management facility 100, such as when the template is created by an administrator. During this interaction 802, the threat management facility 100 may assign an endpoint identifier ("X"), and may store the endpoint identifier and the template identifier in the directory of managed devices. The registration interaction 802 may result in an entry being recorded in a data structure, such as an endpoint directory or any of the other device directories, caches or other data structures described herein, that is accessible to the threat management facility 100.

After the template is administratively registered, a request for services interaction 804 by an instance of a virtual machine derived from template A may be treated comparably to service request interaction 704 of FIG. 7. The request from the virtual machine instance (inst0) may include an endpoint identifier (ID=X). In this example the endpoint identifier ID=X comes from the template (template A) originally registered by the administrator. The request may include other information, such as user identification information (e.g., USER=1) for a user who has logged in to the instance, inst0. For the purposes of describing an embodiment in which duplicate endpoint requests are detected, the threat management facility 100 may identify the endpoint identified in this service request (ID=X) as not yet being present in a directory of endpoints. This enables the threat management facility 100 to create an entry in the directory and assign it a session token (AAA).

Service interaction 805 indicates an exchange between the threat management facility 100 and the registered endpoint inst0 with identifier ID=X for session token AAA. The threat management facility 100 may determine that the request includes an endpoint identifier and a session token that matches a corresponding entry in the directory. This interaction results in a service response without making changes to the session token or the endpoint identifier.

A subsequent request for services 806 may be received from another instance (inst1) of the virtual machine that is derived from the same template used to generate instance inst0. This is indicated in FIG. 8 by the request in interaction 806 including endpoint identifier ID=X, which is the endpoint identifier assigned during registration of template A in interaction 802. The threat management facility 100 examines the request in interaction 806, determines that an entry exists in the endpoint directory for an endpoint with identifier ID=X. Because the request does not include a session token, the threat management facility 100 assigns session token BBB to the request and updates a corresponding entry in the directory (e.g., an entry for endpoint ID=X) with the assigned session token. At this point, the service interaction 806 may not be treated as a duplication of requests from an endpoint with endpoint identifier ID=X because there is no conflicting session token. Because the entry in the database now reflects session token BBB, until such time as a request for services is received for endpoint identifier ID=X with previously assigned session token AAA (or does not include a session token), the threat management facility 100 operates with the understanding that there is only active endpoint with identifier ID=X. If, for example, instance inst0 had crashed or otherwise was no longer operational (e.g., its virtual desktop infrastructure environment was torn it down), requests for services for the combination of endpoint ID=X and session token=AAA would no longer occur. In this way, endpoint deduplication remediation activity may not be required until a further request for services from and endpoint with identifier ID=X is detected.

Further, by the threat management facility 100 responding to a request for services from an endpoint with a known identifier (ID=X) and optionally for a given user, but without a session token by assigning a new session token and updating the corresponding record in the endpoint directory, the threat management facility 100 may enable reconnection by a user using a virtual machine instance to an existing endpoint management session under an updated session token value.

Continuing with the example of FIG. 8, virtual machine instance inst0 requests services in service interaction 808 by identifying itself by endpoint ID=X (optionally by a user identifier) and session token AAA that was assigned in service interaction 804. Due to an entry in the endpoint directory for endpoint identifier ID=X being currently associated with session token BBB (due to service interaction 806), the threat management facility 100 may detect the service request in interaction 808 as being from a duplicated endpoint. While a single interaction 808 in the embodiment of FIG. 8 results in flagging an endpoint as duplicated and needing remedial action, the threat management facility 100 may set a minimum threshold for a count of such likely duplicated interactions that must be met before remedial action is activated. In example embodiments, a minimum of three interactions that indicate a duplicated endpoint may be required before the endpoint identifier is flagged as a duplicate. In this way, the computational overhead required for remediating duplicated endpoint requests may be mitigated, at least temporarily. After achieving a minimum threshold of identical end point identifiers (optionally one but as many as three or more), the threat management facility 100 may mark the current entry in the endpoint directory for endpoint identifier ID=X as a duplicate entry so that future requests from endpoints identified by ID=X can be handled as duplicates to avoid having duplicate entries in the endpoint directory. It may also respond to the service request in service interaction 808 by instructing the requesting endpoint to register with the threat management facility 100. The requesting endpoint responds to the register instruction by conducting a registration interaction 810 that concludes with the threat management facility 100 recording a new endpoint identifier (ID=Y) into a new entry in the endpoint directory. A next representative interaction 811 between inst0 using newly assigned endpoint ID=Y results in the threat management facility 100 assigning a new session token CCC for use by inst0 in subsequent interactions.

Endpoint duplication remediation may be based on a virtual machine identifier that is derived using information exchanged between an endpoint and the threat management facility 100. The virtual machine identifier may, for example, be based on a combination of one or more of user identification data associated with the user who logged in to the compute instance, a template identifier for the compute instance, the session token created for the current network session with the compute instance, compute instance identification data such as a machine fingerprint or a machine identifier assignment by the virtualization platform and received by the threat management facility 100 when the compute instance requests to join the enterprise network, identification data for a template on which the virtual machine instance is based, an endpoint identifier ID provided by the threat management facility 100 during a registration process of the virtual machine image, and the like. The user identification information may include a user name, password, login authorization from the enterprise network, token or the like from an identity provider, and the like. In general, user identification data may uniquely identify the user within the enterprise network. A virtual machine identifier may be derived from one or more elements described above that may be used to create the virtual machine identifier. In one aspect, the deduplication process may use a combination of template and user to identify unique, valid compute instances in the virtual computing environment. For example, the virtual machine identifier may be a random identifier assigned to a specific user/template pair, a concatenation of user identification data and template identification data, a hash of user identification data and template identification data, or some combination of these.

Service request 812 from endpoint instance inst1 that includes endpoint identifier ID=X and session token BBB may be detected by the threat management facility 100 as being received from an endpoint with a duplicated identifier. This may be a result of the threat management facility 100 comparing information in the service request 812 (e.g., the endpoint identifier, session token, user identifier and the like) to the directory of endpoints. As an example, due to the service request 808 from an endpoint with identifier ID=X, an entry in the endpoint directory that corresponds to endpoint identifier ID=X was marked as duplicated. Therefore, the service request in service interaction 812 that includes endpoint identifier ID=X is determined to be for a duplicated endpoint identifier. This determination may be based on more than merely the presence of endpoint identifier ID=X, such as a session token value, or other information as described herein. The threat management facility 100 may respond to the service request 812 similarly to its response to service request 808—instructing the requesting endpoint (inst1 in this case) to register to facilitate remediation of the duplicate endpoint. The instance inst1 responds to the register instruction by registering and receiving a new endpoint identifier (ID=Z) and a unique session token (DDD) as depicted in interaction 813. For illustration simplicity, interaction 813 includes a register interaction (e.g., register interaction 810) and a session token interaction (e.g., interaction 811). The combination of endpoint ID=Z and session token DDD may be stored in the corresponding entry (for ID=Z) in the endpoint directory so that future interactions between an endpoint and the threat management facility 100 that reference endpoint identifier ID=Z with session token DDD may be treated as ongoing requests for service, such as interaction 805 described above.

The interaction between endpoint instance inst1 and the threat management facility 100 in request interaction 812 depicted in FIG. 8 is treated as a duplicated endpoint due to the detection of endpoint instance inst0 with endpoint identifier ID=X being deemed a duplicate in interaction 808. However, the endpoint instance inst1 may optionally not be treated as a duplicate in request interaction 812 at least because it includes a valid endpoint identifier (ID=X) and session token BBB in its service requests. In this way, ongoing interactions between inst1 and the threat management facility 100 that include this combination of endpoint identifier and session token may be treated as ongoing service requests, such as interaction 805 described above. This example is indicative of the flexibility with which apparently duplicated endpoints can be remediated. Other examples follow below.

Due to an entry for ID=X in the endpoint directory being marked as a duplicate endpoint identifier (see interaction 808), any future requests for services from endpoints with an endpoint identifier ID=X may be treated as duplicate independent of presence of a session token in the request. However, remediation of such duplicate detections may be based on the type of endpoint and an identity of a user logged in to the endpoint, such as an endpoint that is derived from a template as described herein. As an example, request interaction 814 depicts such a duplicate detection. In this example, an enterprise client administrator has authorized a virtual desktop infrastructure to instantiate additional instances of a virtual machine based on template A—that was assigned endpoint identifier ID=X when it was registered with the threat management facility 100 (see registration interaction 802 for example). Interaction 814 depicts a request from such an additional instance (inst2) that is treated as duplicative at least because the endpoint identifying information in request interaction 814 (ID=X) matches to an endpoint identifier that has been deemed to be duplicated by the threat management facility 100 (see interaction 808). The threat management facility 100 instructs the endpoint to perform a registration interaction to facilitate duplicate endpoint remediation. Referring to registration interaction 815, the endpoint registers as having ID=TEMPLATE A and being operated by USER=1. Because the registration request in interaction 815 indicates that the request is from an endpoint based on a template (thereby indicating that the request for registration is from a virtual computing instance), the threat management facility 100 examines the endpoint directory for entries that match information provided in the registration request, specifically a combination of a user with value USER=1 and a template with value TEMPLATE=A. During interaction 808-811, the threat management facility 100 created a matching entry while interacting with endpoint instance inst0. This matching entry is merged into an entry for the current registration interaction 815 and assigned a new session token value EEE. The endpoint identifier ID=Y found in the matching entry is assigned to the endpoint instance inst2.

Detection and remediation of duplicate endpoints may include different actions based on endpoint type (e.g., physical versus virtual), duplication status of an endpoint identifier presented in a request for services, presence, absence, or value of a session token in a request for services, correspondence of a virtual machine identifier derived from a request for services with information found in the directory of endpoints, rate of duplicate endpoint detection, loading of one or more processors executing the threat management facility 100, and the like. As described above, not all requests that include substantively identical identifying information are determined to be duplicates. As an example, the service request in interaction 806 of FIG. 8 may include information that substantially duplicates information in the service request in interaction 804, but is not identified as a duplicate entry. Rather, the threat management facility 100 updates a corresponding record in the endpoint directory. In this example, this results in effectively merging activity for an endpoint in request 806 with the records of activity of the endpoint in request 804.

Yet further, remediation of duplicated endpoints (e.g., as exemplified by steps 808, 810, and 811 and the like) may be rate limited, such as to avoid excessive registration activity workload upon the threat management facility 100. Conditions that may be considered when determining an impact on performance or responsiveness of a threat management facility due to endpoint registration activity may include a maximum count of concurrent registrations, a reduction in responsiveness to requests for enterprise network services, overall computational demand, and the like, any of which may be used as factors in controlling a rate of remediation for endpoint duplication. By operating the threat management facility 100 to limit activating endpoint registration activity in response to these factors, a steady state rate of endpoint registration activity may be achieved over time. One non-limiting example is thirty registration activities within five minutes. Use of rate limit for remediation of detected duplicated endpoints may result in better overall performance while ensuring that, over time, duplicate activity that was deferred during a first threshold session, will be performed on a subsequent session interaction between a duplicated endpoint and a threat management facility.

Endpoints in an enterprise network may be configured as virtual machines instantiated from a software template that may include, among other things, a version of endpoint software with features that support the endpoint requesting and receiving services, such as security services, from a threat management facility of the enterprise network. In addition to interacting with a threat management facility for services, an endpoint may perform automatic updates to its software. Endpoint software updates may be made available to the endpoints over the enterprise network on a regular basis. In addition to software updates, security updates may also be available to endpoints. Security updates may be made available frequently, including several times each day. Security updates may include features, such as signature-based detection data structures and the like used by endpoint software to perform malware detection, remediation, and other security activities. Generally, security updates may be automatically preformed and may be agnostic of which version of software, such as which version of a security agent service, is executing on the endpoint.

However, updated versions of endpoint software may present compatibility issues and may cause other impacts on endpoints and/or network operations. To mitigate these impacts, a security services client participating in the enterprise network that deploys endpoints via virtual machines instantiated from software templates may control, such as through a security services client admin device, conditions under which software executing on a deployed endpoint may be paused and under which software may be automatically updated. The security services client may pause updates to one or more deployed endpoints based on a range of conditions including time, current software version, endpoint identifier, and the like.

Figure 9:
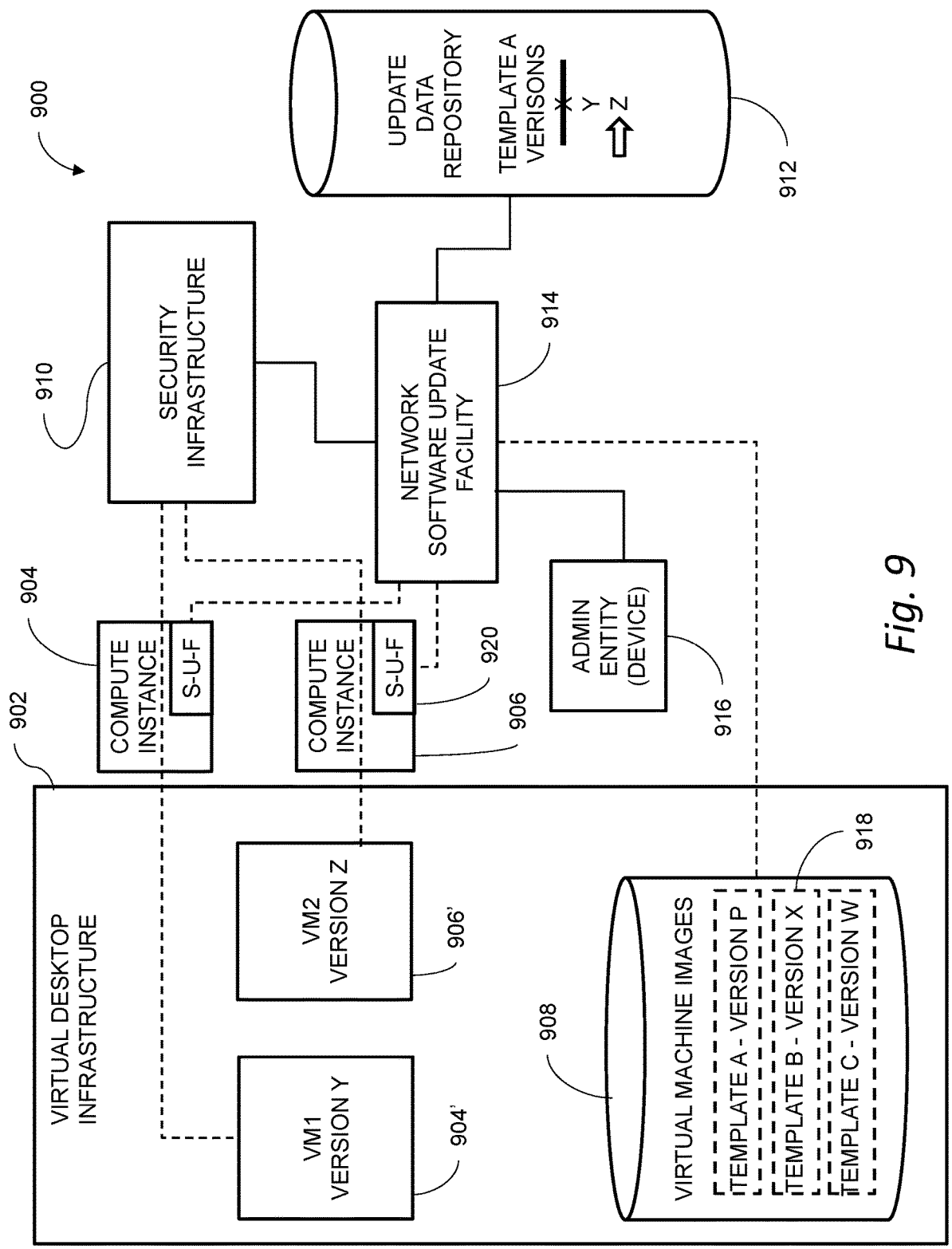
FIG. 9 illustrates an exemplary enterprise network including enterprise network compute instance endpoints representing virtual machine instances that are instantiated in a virtual desktop infrastructure from one or more software templates.

FIG. 9 depicts an exemplary enterprise network 900, in accordance with example embodiments, including enterprise network compute instance endpoints 904 and 906 representing virtual machine instances 904' and 906' that are instantiated in a virtual desktop infrastructure 902 from one or more software templates 918. Virtual desktop infrastructure 902 may be configured and function similarly to the virtual desktop infrastructure 302 of FIG. 3. Exemplary embodiments of configuring and operating endpoints in an enterprise network based on software templates are described elsewhere herein. As an example, the virtual machine instances 904' and 906' may be instantiated using a virtual machine image from a set of virtual machine images 908 that are based on one or more templates 918. A virtual machine image template 918 may include functionality, such as a software update facility 920 that facilitates managing updating software on endpoints, including pausing software updates on endpoints. The virtual machine image 918 may further include and/or enable accessing functionality to interact with enterprise network security infrastructure 910 to provide security services to endpoints and other resources of the enterprise network 900.

Updating endpoint software may be managed through pausing updates to the one or more deployed endpoint compute instances 904 and 906. Software updates, such as impacting a version of an existing security agent service on the endpoint, may be controlled in a variety of ways to ensure, among other things, security of resources of the enterprise network 900 and stability of operation of applications of the enterprise network. As new versions of software are made available to endpoint compute instances 904 and 906, an automatic software update facility may attempt to update corresponding software on deployed endpoints. An automatic software update facility may include a network-based component, such as a network-based software update facility 914, and/or an endpoint-based component, such as endpoint update software facility 920. These two software update facilities may work cooperatively to manage pausing endpoint software updates to satisfy one or more update pause conditions. The virtual machine image 918 may further include a configured software update parameter (and/or software to configure a software update parameter) that may signal to the network software update facility 914 and/or to the endpoint update software update facility 920 that updates to machines instantiated from this virtual machine image are to be paused.

A network-based software update facility 914 may receive endpoint software update management information for managing updating endpoints deployed in the enterprise network. Software update management information may be received from an administrator, such as an administrator of the enterprise network, a security services client administrator, and the like through administration device 916. Security management and other services of the enterprise network may provide software update management information, such as data that identifies critical updates to a security agent for use by endpoints. This information may include a minimum version of endpoint software that qualifies for pausing updates. The network-based software update facility 914 may manage detection and administration of different versions of endpoint software for a plurality of network security services clients and further for a plurality of software templates. In example embodiments, an update data repository 912 may include information for managing versions of endpoint software. The network software update facility 914 may access the update data repository 912 to manage updating software on endpoints in the enterprise network, such as to store and/or retrieve one or more versions of software for endpoints, to determine which version of software is recommended, and the like. The endpoint software versions available in the update data repository may be indexed by one or more aspects of the software, such as a template identifier to which the software is applied, a version indicia of the software, and the like. In example embodiments, a network software update facility 914 may communicate with software update facility services 920 to determine an identifier of a software template that has been used to instantiate the endpoint. This information may be used to identify if an updated version of endpoint software for an endpoint instantiated from the identified template is available in the update data repository 912. In the example of FIG. 9, the update data repository, for template identifier "A" may determine that an older version "X" of endpoint software is no longer supported and therefore requires updating, a recommended version "Z" of endpoint software is available, and endpoint software version "Y" is a most recent version. The network software update facility 914 may send a communication to an endpoint software update facility 920 that recommended software version "Z" is available for the endpoint.

Updating software of endpoints in the enterprise network may be performed by the software update service 920 configured to execute on a processor of a deployed endpoint. This software update service 920, or other software executing on an endpoint, may inquire if an updated version of software is available for executing on the endpoint. Therefore, pausing updating software on each endpoint may be enacted through, for example, ensuring that an indication of update pause is made known to an endpoint at least when the endpoint attempts to perform a software update. This may be done through one or more software update status exchanges, such as the updated software availability inquiry above, between an endpoint and a software update facility 914 of the enterprise network.

By providing a software update pause indication (e.g., a pause parameter) to an endpoint, the endpoint may refrain from performing an update to its software independent of updated software being available for the endpoint. Pausing endpoint software updates may also be managed from an enterprise network update service 914 executing on a processor of the enterprise network, such as a server that manages endpoints in the network. An enterprise network update service 914 may determine for each endpoint, based at least in part on a corresponding security services client-specific software pause administration approach (e.g., security services client-wide, endpoint-specific, and the like), if updated software is to be made available in response to a request therefore. By adapting how the enterprise network update service 914 responds to an inquiry for availability of updated software, updates may be paused for an inquiring endpoint. As an example of enterprise network update service-based update pause control, the enterprise network update service 914 may determine, such as based on software update pause instructions received from an administrator of a security services client for an endpoint, how to respond to an endpoint inquiry for availability of updated software. In this example, the enterprise network update service may determine, based at least in part on the software pause instructions, that updating software is paused for the endpoint requesting availability of updated software. Therefore, the enterprise network update service may respond to the request by the specific endpoint that updated software is not yet available. The endpoint software update facility 920 will continue to inquire about the availability of updated software and until it receives an indication that updated software is available, the endpoint will continue executing its current version of software. Actions by the enterprise software update facility 914 may include examination of other software update parameters, such as a version indicator of software currently executing on the endpoint, to ensure that a software update pause override condition, such as a software version-related condition that triggers activating updating software on the endpoint is not present. When an evaluation of a condition indicated in a software pause parameter results in enabling updating software for the endpoint (e.g., a pause-duration value has expired), a next request for availability of updated software for the endpoint may be responded to differently, such as by indicating that updated software is available for the endpoint.

Controlling software updates may be based on a range of conditions including time, current software version, endpoint identifier, and the like. Controlling software updates based on time may include identifying a start time (e.g., a day and/or date and/or time of day) after which updating software is paused. By default, pausing updates may start when an indication of pausing updates is presented by the security services client, such as when an administrator of a security services client uses a user interface of an administrative device (e.g., an endpoint operated by an administrator of the security services client) to commence pausing updates. Other time-related update pause actions may include pausing for a duration of time, which may default to a software update availability schedule, such as 90 days. A default duration of time for pausing updates may be security services client-specific, such as a duration of time (optionally different than the 90 day software update availability schedule) specified by an administrator for testing and/or introducing an updated version of endpoint software. A duration of time for pausing software updates may be expressed as a temporal offset value relative to a pause start time. Rather than specifying a duration for pausing software updates, a security services client may identify a date or day (and optionally a time within a time zone) after which automated updating may resume. While software updates are paused for one or more endpoints, time-related conditions for pausing may be terminated or adjusted, thereby shortening (e.g., by reducing an update pause duration or specifying an earlier update pause end date) or lengthened (e.g., by increasing a pause duration or specifying a later update pause end date). Pausing software updates based on time may include pausing software updates on endpoints instantiated before or after a specific day/date. For example, a security services client may determine that endpoints instantiated after a specific date (e.g., a date associated with a release of a new software template from which virtual machine-based endpoints are instantiated) are to be paused from updating, while endpoints instantiated before that date are to be updated. This may be useful for removing older software executing on endpoints in an enterprise network independent of an indication of software version that may be provided from the endpoint. In an example, if software version data is spoofed (e.g., by malware executing on an endpoint), an instantiation date, which may be controlled by a virtual device infrastructure environment in which software template-based virtual machine endpoints are instantiated, can be used for managing updating endpoint software.

Controlling software update pausing based on software version, such as a minimum version for pausing software updates, may be administered based on differing software version conditions. In an example, when a minimum software version for pausing updates is specified, endpoints currently executing a software version lower than the minimum may be excluded from a software update pause parameter as may be configured by an administrator. A minimum software version may be designated by the security services client administrator. This may facilitate ensuring that endpoints operating in the enterprise network comply with a set of features of the security services client, such as for ensuring compatibility with security services client services of endpoints in an enterprise network for which security services are managed, and the like. A minimum software version may also be designated by an administrator of a security infrastructure of the enterprise network (e.g., to ensure that a critical security capability is present on endpoints in the enterprise network, such as executing a security agent that interacts with security services of the security infrastructure).

Controlling software update pause based on device identifier may include an administrator providing context for determining which deployed endpoints in an enterprise network to pause. Context may include listing specific endpoint identifiers, a range of endpoint identifiers so that in environments where identifiers are created in ascending order, endpoints with an identifier less than a specific value may be paused, and the like. Other context may include a security services client identifier of the endpoint, which may be provided by a software template from which a virtual machine-based endpoint is instantiated. When a security services client identifier is used to control pausing software updates, updating software for endpoints associated with the security services client identifier may be paused. Controlling software update pause based on device identifier, such as an endpoint identifier and/or a security services client identifier that may be assigned during an endpoint deduplication process described herein, may be automated by configuring a software update pause parameter to cause pausing of software updates when such a security services client identifier identifies an endpoint instantiated from a software template. One example of such endpoints configured as a virtual machine endpoint from a software template can be found in the embodiments of FIGS. 3 and 4 herein.

The virtual desktop infrastructure of FIG. 9 depicts two instantiated virtual machines. A first virtual machine 904' is instantiated from software version "Y" and a second virtual machine 906' is instantiated from software version "Z". Corresponding compute instances 904 and 906 may represent the virtual machines as endpoints in an enterprise network. Compute instance 904 is deemed to be executing software version Y and compute instance 906 is deemed to be executing software version Z. Each compute instance may send an inquiry into the enterprise network, such as to a software update facility, (e.g., network software update facility 914), for availability of updated software.

In a first example of updating software on an endpoint based on availability of updated software and a pause update parameter, both endpoints may be managed by a common security services client who may have indicated to pause software updates for all endpoints deployed to end users of the security services client, but not for those endpoints deployed to administrator(s) or to a specific administrator, such as an administrator attempting to test/validate available updated software. In this first example, the endpoint 904 may be deployed to an end user and the endpoint 906 may be deployed to an administrator of the security services client. Therefore, in response to the inquiry, the endpoint 904 may be told that no updates are available, or it may be provided a pause parameter that indicates the endpoint 904 is to pause updating endpoint software. As a result, the endpoint 904 will continue to execute software version Y. Also in a response to the inquiry, the endpoint 906 may be told that updated software is available, because the endpoint 906 is deployed to (e.g., being operated by) an administrator. As a result, software on the endpoint 906 will be updated from version Z to a recommended version, such as Z1.

In a second example of updating software on an endpoint based on availability of updated software and a pause update parameter, software may be paused for endpoints deployed for a security services client executing software version Z or higher. Therefore, updating software of the endpoint 906 is paused (it is executing software version Z), whereas updating software of the endpoint 904 is activated (it is executing software version Y, which is below the software update pause version threshold portion of the pause parameter). In this example, software on the endpoint 904 may be updated to version Z, which may not be the most recently available version (e.g., version Z1 as noted in the first example), but may be the available software version that satisfies the minimum software version pause parameter. The security services client administrator may indicate which version of software to be applied when updating eligible endpoints. In this example, the administrator has indicated to update to version Z. In another example an administrator may indicate that endpoints eligible to be updated are to be updated to a recommended version of software, such as version Z1.

In a third example of updating software on an endpoint based on availability of updated software and a pause update parameter, a security services client administrator may have identified that endpoint 904 is not eligible for updating, therefore software updates are paused for the endpoint 904. If, in this example, the administrator did not indicate to pause software updates for the endpoint 906, as a result of the endpoint 906 inquiring about available updated software, the software executing on the endpoint 906 could be updated to an available version, such as recommended version Z1.

Pausing updates to one or more deployed endpoints may be administered in a variety of ways, including without limitation, security services client-wide (e.g., updates to deployed endpoints of the security services client are paused), endpoint-specific (e.g., the security services client may specify a subset of deployed endpoints for which updating software is paused), based on a version of software executing on a deployed endpoint, based on a version of software configured in a software template that was used to deploy an endpoint, and the like. Configuring software update pause parameter conditions may include actions to configure and/or maintain control of software version updating of endpoint. These actions may be performed by, for example, an administrator of one or more security services clients of the enterprise network. This may include configuring an update pause parameter data structure of the enterprise network that indicates, for deployed endpoints, one or more conditions that determine if and how (at least in part) endpoint software is to be updated and/or paused.

Figure 10:
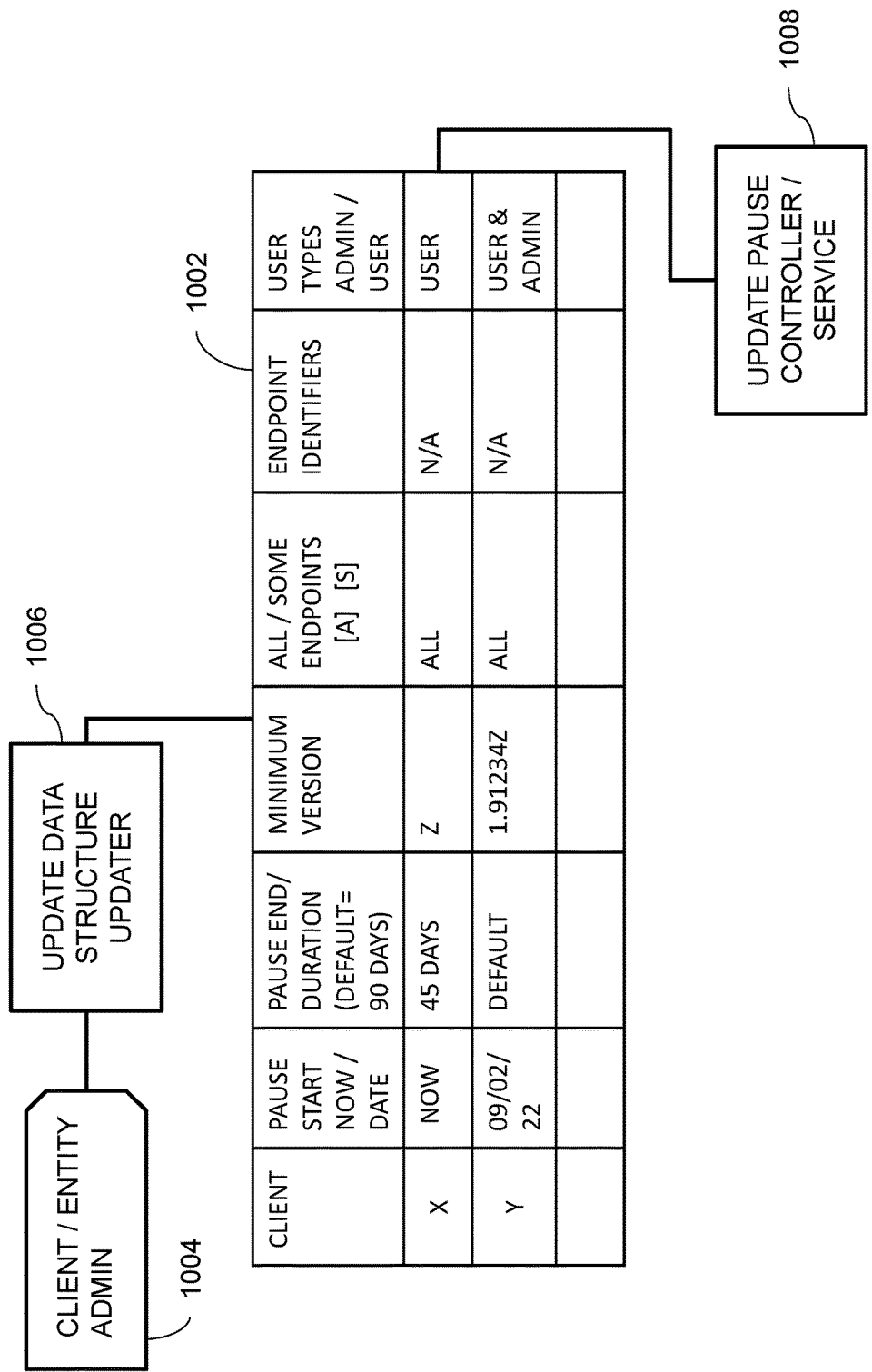
FIG. 10 illustrates an update pause parameter data structure of conditions that impact pausing updating endpoint software.

An example update pause parameter data structure 1002 depicted in FIG. 10 may include entries that facilitate identifying and applying software update pause-related characteristics of endpoints in the network. Pause parameter information stored in the update data structure 1002 may include, for any of a security services client, an endpoint, a software template, and the like: (i) a start time for pausing software updates, (ii) an end time for pausing software updates, (iii) a duration of pausing endpoints (e.g., optionally with a relative start condition and/or time), (iv) identifier(s) of one or more endpoints for which software update is paused, (v) identifiers of one or more software templates for which software updating is paused for endpoints instantiated therefrom, (vi) identifiers of a minimum version of endpoint software for which software update is paused, (vii) whether or not one or more of the time/duration parameters applies to the endpoint, and the like. As an example, a security services client administrator 1004 may interface with an update data structure updater 1006 to configure the update pause parameter data structure 1002 with information that may indicate a compound set of conditions for determining if software updating may be paused for an endpoint. Pause parameter conditions may include: (a) a minimum version of software for pausing updates, which may cause endpoints executing versions of software lower than the minimum version may be updated independently of any other condition; (b) an end time for pausing updates, which may be later than a current time, therefore preventing updates to endpoints with an otherwise update-eligible software version; (c) endpoint identification data (e.g., an identifier of a user operating an endpoint), which may identify an administrator of the security services client 1004 who may be testing endpoint software updating, and the like. An endpoint software update service 1008 may weight each of the pause parameter factors in light of current enterprise network and security services client-specific software update rules. Software update rules may be determined from the update pause parameter data structure 1002. Such rules may enable updates on some endpoints, such as endpoints operated by an administrator performing a software test protocol. These rules may pause updates on others, such as endpoints operated by a user.

In an example depicted in FIG. 10, security services client "X" may have indicated a set of conditions for configuring a pause parameter for the endpoints of the client. In this example, client X has indicated to start pause now, which may be a date and time when the client administrator completes configuring this update pause parameter data structure. In example embodiments, "now" may be a default pause start date condition. An administrator may specify a different pause start date/time. Security services client "Y" indicates that pausing is to take effect on a specific date. Security services client X and client Y indicate different pause duration conditions. A pause parameter for security services client X will result in software updates being paused (as adapted by other conditions) for 45 days. Security services client Y has indicated to use a default duration of pause when generating a pause parameter, or has opted to not indicate a duration that is different from the default duration.

Security services client X further indicates a version condition for this pause parameter by designating version "Z" as a minimum version. Therefore, endpoints executing software versions less than (e.g., released earlier than) version "Z" are eligible for software updating. Both security services clients indicate that client endpoint updates are to be paused. Security services client Y has configured a user type condition of a corresponding pause parameter to pause updates of endpoints operated by either end users or administrators.

In example embodiments, a pause parameter for use in managing updating software on endpoints in an enterprise network may be a composite pause parameter that may include one or more conditions from the update pause data structure 1002. Determining if, and/or how, and or when updating software for an endpoint is to be paused may be based at least in part on such a pause parameter. Further conditions impacting pausing updating software on endpoints in an enterprise network that are not explicitly defined in the update pause data structure 1002, such as enterprise-based conditions, network-based conditions, security conditions, and the like may be included in an instance of a pause parameter being applied to an update pause determination. One example of such a condition that applies to endpoints embodied as virtual machines executing in a virtual desktop infrastructure is a security condition of a virtual desktop infrastructure. If the security condition of a virtual desktop infrastructure instantiating endpoints for use on the enterprise network is determined to be compromised or potentially compromised, a potential enterprise network security action may include forcing updates of endpoints of the compromised virtual desktop infrastructure to ensure that a minimum level of endpoint malware deterrence is present and functional on corresponding endpoints.

Updating software of endpoints in the enterprise network may be performed by a software update service configured to execute on a processor of a deployed endpoint, such as the software update facility 920 described for embodiments of FIG. 9. This software update service, or other software executing on an endpoint, may inquire if an updated version of software is available for executing on the endpoint. Therefore, pausing updating of software on each endpoint may be enacted through, for example, ensuring that an indication of update pause is known to an endpoint, such as by providing the pause parameter to the endpoint. This may be done through one or more software update status exchanges associated with the updated software availability inquiry between an endpoint and a software update facility of the enterprise network. In example embodiments, one or more conditions from which a pause parameter may be derived may be made known to the endpoint (e.g., via the update status exchanges and the like) so that endpoint software update management capability on the endpoint may derive a corresponding pause parameter for the inquiry instance. In example embodiments, a composite pause parameter may include a portion derived by the network software update facility based on conditions/update-impacting elements known to a network software update facility (e.g., default duration and the like). The composite pause parameter may further include a portion derived by software update management functionality executing on the endpoint, such as a relationship of a version of a software executing on the endpoint to a minimum pause-eligible version. The composite pause parameter may be used to determine and manage pausing software updates for an endpoint during an instance of updated software availability. A pause parameter may override availability of updated software so that an endpoint that receives an indication that updated software is available may pause updating its software.

Figure 11:
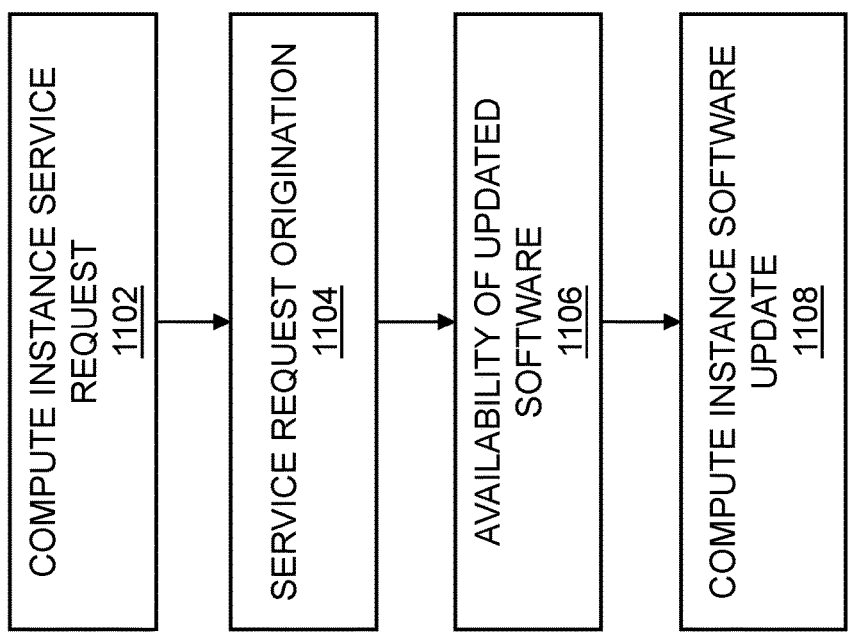
FIG. 11 illustrates a high-level flow diagram for determining availability of updated software and adapting update behavior for virtual machine-based endpoints.

FIG. 11 depicts a high-level flow diagram, in accordance with example embodiments, for determining availability of updated software and adapting update behavior for virtual machine-based endpoints in an enterprise network based at least in part on a pause parameter. In example embodiments, adapting automatic software update behavior for virtual desktop infrastructure deployed endpoints in an enterprise network may involve determining that an endpoint in the enterprise network is a compute instance embodied as a virtual machine, and optionally that the virtual machine is instantiated from a software template for which version control is administered by a server of the enterprise network. Another step for adapting update behavior may include a step 1102 of detecting a request for services of a threat management facility for an enterprise network. Yet another step 1104 may include determining that the request originates from a compute instance embodied as a virtual machine instantiated from a versioned software template. Yet further, a step 1106 for adapting update behavior may include determining, optionally in response to an inquiry from the compute instance that has made the request for services, availability of updated software for the compute instance based on one or more aspects of the compute instance. These aspects may include an aspect of the versioned software template used to instantiate the virtual machine. Determining availability of updated software may further be based on a result of comparing an aspect (e.g., a version) of the versioned software template to a recommended software version for the compute instance. Such a recommended software version and/or a corresponding version thereof may be retrieved from an update data repository of the enterprise network. The recommended software version may be a minimum software template version for instantiating virtual machine-based compute instances. A further step 1108 for adapting update behavior may include conditionally updating software on the compute instance based on the availability of updated software and an update pause parameter. The software may be updated if the update pause parameter indicates that updating software for the virtual machines instantiated from the versioned software template is permitted for the compute instance.

In example embodiments, comparing an aspect of the versioned software template to facilitate determining availability of updated software for the compute instance may include comparing a version parameter of the versioned software template with a version of a recommended software template. This version parameter of the versioned software template may be included in a system configuration data structure of the compute instance.

In example embodiments of adapting update behavior for endpoints in an enterprise network, comparing an aspect of the versioned software template may include comparing indicia of a security agent configured to execute on the compute instance. In a first aspect, the security agent is instantiated from the versioned software template and the indicia of the security agent includes a version parameter of a security agent module of the versioned software template. In another aspect, the security agent is instantiated through a communication between the compute instance and the threat management facility 100 and the indicia of the security agent includes a version parameter of the instance of a security agent module executing on the compute instance.

In example embodiments of adapting update behavior of compute instances in an enterprise network, an update pause parameter may apply to the compute instance from which the request for services originated. The update pause parameter may apply to one or more named compute instances that may be identified by one or more virtual machine (e.g., endpoint) identifiers in a set of records of virtual machine identifiers. The update pause parameter may further apply to virtual machines instantiated from the versioned software template, which may include virtual machine endpoints other than the compute instance form which the request for services originated. Application of the update pause parameter may be limited to security services client-determined virtual machine instances of the versioned software template, such as specific virtual machines, virtual machines that meet a set of conditions, and the like.

Adapting update behavior of compute instances in an enterprise network may be based on application of the pause parameter to virtual machines instantiated from a versioned software template that is within a range of software versions. As an example, the range of software versions may include software versions that are within two versions of the recommended software version.

The update pause parameter used for adapting update behavior of compute instances in an enterprise network may be calculated from a combination of a security service client-specific software update pause indication and a version of security client software executing on the compute instance. In example embodiments, the update pause parameter and/or a set of conditions from which the update pause parameter may be generated may be retrieved from the compute instance, the update data repository, or other locations in the enterprise network, such as an enterprise software update facility, one or more different compute instances, and the like. The update pause parameter, however sourced and/or generated, may be compute instance-specific and/or versioned software template version-specific.

Yet further an update pause parameter used for adapting update behavior of compute instances in an enterprise network may include a temporal offset value (e.g., pause duration) that may be relative to an update pause start date. The temporal offset value may facilitate determining a maximum time for pausing updates.

In example embodiments, the request for services may include a request for a determination of availability of updated software for the compute instance. The services requested may include determining availability of updated security agent software. Yet further, the request for services may include indicia of a system configuration of the compute instance, such as indicia of the versioned software template, and the like. The step of determining that the request originates from a compute instance embodied as a virtual machine may be based on indicia included in the request. Further the recommended software version may be accessed from the update data repository based on the indicia included in the request. Also, the update pause parameter may be accessed from the update data repository based on the indicia included in the request. Determining that the request originates from a compute instance embodied as a virtual machine may be based on a system configuration data structure of the compute instance. Further, determining that the request originates from a compute instance embodied as a virtual machine based on a software template of the enterprise network may include comparing indicia of the software template from the request to a list of templates in a compute instance management data structure of the enterprise network.

Adapting update behavior of compute instances in an enterprise network may include updating software on a compute instance to the recommended software version, to a version other than the recommended software version, or to a version of the software that is different than software indicated by the version parameter of the software template and that is different than the recommended software version. Updating software on the compute instance may include updating a local security agent of the compute instance. Further, updating software may include receiving at least a portion of the updated software from a third-party application provider.

Adapting update behavior of compute instances in an enterprise network may include application of a pause parameter that indicates that updating software is restricted indefinitely. The applied pause parameter may indicate that updating software is permitted after an update deadline. Yet further, the update pause parameter may be configurable based on compute-instance associated indicia in the request. The update pause parameter may indicate at least one software template indicia to which updating software is permitted. Also, updating software may further be based on comparing the indicia in the request to the indicia indicated by the update pause parameter.

In example embodiments, adapting update behavior of compute instances in an enterprise network may further include threat management facility providing the services responsive to the compute instance installing a version of software that is different than the version of software provided with the template. The threat management facility 100 may provide the services responsive to the compute instance executing the version of software provided with the template. In response to detecting that the update pause parameter indicates pausing software updates, the threat management facility 100 may provide network security services to the compute instance executing the version of software provided with template. And, in response to detecting that the update pause parameter indicates enabling software updates, the adapted update behavior may include causing an install of a version of software that is different than the version of software provided with the template.

In example embodiments, the methods and systems described herein for adapting update behavior of compute instances in an enterprise network may be combined with the methods and systems described herein for determining and resolving duplicate virtual machine-based endpoints in an enterprise network. As an example, a step in a process for determining and resolving duplicate virtual machine-based endpoints, a process described herein and depicted in an example embodiment in FIG. 5 herein, may include adapting update behavior for each such virtual machine-based endpoint by automatically pausing software updates for each such endpoint. To facilitate automatically pausing software updates for each virtual machine-based endpoint requesting network security services, an update pause parameter may be configured for the endpoint and associated with an endpoint identifier provided to the endpoint during, for example, a registration sub-process when determining and resolving duplicate virtual machine-based endpoints. The configured update pause parameter may then be used in subsequent software update workflows, examples of which are described herein. An example application of an automatically configured update pause parameter includes pausing updates (e.g., by a software update service of an enterprise network server and/or of the endpoint) until a condition, examples of which are described herein, is detected to allow updating software on the endpoint. Automatically pausing software updating of a virtual machine-based endpoint during endpoint deduplication as described herein provides a benefit of ensuring that a set of rules for handling updating of software of virtual machine-based endpoints instantiated from a software template may be defined and followed. As an example, if an enterprise security services client has defined a range of acceptable versions of a software template, applying the methods and systems for deduplication of virtual machine-based endpoints as described herein that includes automatically configuring an update pause parameter for each such virtual machine-based endpoint may facilitate automatically pausing updates for any endpoint instance operating an acceptable version of the software template, while enabling corresponding rules regarding operating an unacceptable version to enable update of a corresponding endpoint. As another example, a security services client may deploy a recommended version of a software template (for use by a virtualization platform when instantiating virtual machines) and rely on the endpoint deduplication process to automatically pause updates for endpoints operating a version of a software template that is different from the recommended version without having to specify update behavior for each of version of the software template. In this way, updating to the recommended version may be based on a set of rules for enabling updating endpoints instantiated from the software template.

Figure 12:
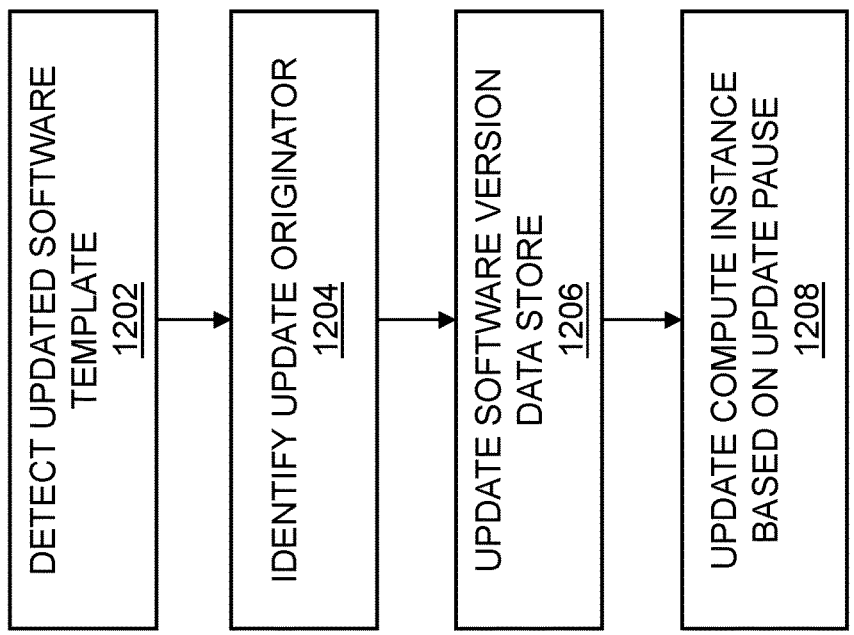
FIG. 12 illustrates adapting update behavior of compute instance endpoints in an enterprise network in response to an update to a versioned software template for instantiated virtual desktop infrastructure endpoints.

FIG. 12 depicts a set of steps, in accordance with example embodiments, for adapting update behavior of compute instance endpoints in an enterprise network in response to an update of a versioned software template for instantiated virtual desktop infrastructure endpoints. One or more computing devices may ensure automatic security updates in a virtual machine-based deployment environment by performing a set of steps. A first step 1202 may include detecting an update to a versioned software template used to instantiate a plurality of virtual machine compute instances receiving services of a threat management facility for an enterprise network. Another step 1204 may include determining that the update originates from an administrator authorized to update the versioned software template. Another step 1206 may include updating software version data for the versioned software template in an update data repository accessible to the one or more computing devices, such as an update data repository of the enterprise network. Yet another step 1208 may include, based on an update pause parameter in the update data repository, causing at least one of the plurality of virtual machine compute instances that are instantiated from the versioned software template to install a version of software consistent with the updated template, which may be a recommended software version for corresponding endpoints.

The administrator authorized to update the versioned software template may be authorized by the threat management facility 100. Also, the update pause parameter may be associated with the versioned software template. In example embodiments, updating software version data may include configuring the update pause parameter of the updated software template to pause software updates for virtual machine compute instances that are based on the updated software template. The update pause parameter may apply to one or more named compute instances that may be identified by one or more virtual machine (e.g., endpoint) identifiers in a set of records of virtual machine identifiers. The update pause parameter may further apply to virtual machines instantiated from the versioned software template, which may include virtual machine endpoints other than the compute instance form which the request for services originated. Application of the update pause parameter may be limited to security services client-determined virtual machine instances of the versioned software template, such as specific virtual machines, virtual machines that meet a set of conditions, and the like. Application of the pause parameter may include application to virtual machines instantiated from a versioned software template that is within a range of software versions. As an example, the range of software versions may include software versions that are within two versions of the updated template.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A non-transitory computer readable medium containing a computer program product that, when executed by one or more computing devices, adapts automatic software update behavior for virtual desktop infrastructure deployed endpoints by performing the steps of:
   detecting a request for services of a threat management facility for an enterprise network;
   determining that the request originates from a compute instance embodied as a virtual machine instantiated from a versioned software template;
   determining availability of updated software for the compute instance based on comparing an aspect of the versioned software template used to instantiate the virtual machine to a recommended software version retrieved from an update data repository of the enterprise network;
   calculating an update pause parameter based on a client-specific software update pause indication and a version of a security agent software executing on the compute instance; and
   updating software on the compute instance based on the availability of updated software and the update pause parameter indicating that updating software for virtual machines instantiated from the versioned software template is permitted for the compute instance.

2. The computer program product of claim 1, wherein comparing an aspect includes comparing a version parameter of the versioned software template.

3. The computer program product of claim 1, wherein comparing an aspect includes comparing indicia of a security agent configured to execute on the compute instance.

4. The computer program product of claim 3, wherein the indicia of the security agent includes a version parameter of the security agent executing on the compute instance.

5. The computer program product of claim 1, wherein the update pause parameter applies to a virtual machine instantiated from a versioned software template that is within a range of software versions.

6. The computer program product of claim 1, wherein the update pause parameter is calculated from a plurality of update pause inputs including update pause time factors, software template version, compute instance user type, compute instance enterprise network identifier, and compute instance security agent version.

7. The computer program product of claim 1, wherein the update pause parameter includes a temporal offset value that is relative to an update pause start time value.

8. The computer program product of claim 7, wherein the temporal offset value determines a duration of time for pausing updates.

9. The computer program product of claim 1, wherein the request for services includes a request for a determination of availability of updated software for the compute instance.

10. The computer program product of claim 1, wherein the request includes indicia of a system configuration of the compute instance.

11. The computer program product of claim 10, wherein determining that the request originates from a compute instance embodied as a virtual machine is based on the indicia included in the request.

12. The computer program product of claim 10, wherein the recommended software version is accessed from the update data repository based on the indicia included in the request.

13. The computer program product of claim 10, wherein the update pause parameter is accessed from the update data repository based on the indicia included in the request.

14. The computer program product of claim 1, wherein updating software includes updating a local security agent of the compute instance.

15. The computer program product of claim 1, wherein updating software includes updating to a version of the software that is different than software indicated by a version parameter of the versioned software template and that is different than the recommended software version.

16. A non-transitory computer readable medium containing a computer program product that, when executed by one or more computing devices, adapts automatic software update behavior for virtual machine endpoints by performing the steps of:
   detecting a request for services on an enterprise network that originates from a compute instance embodied as a virtual machine instantiated from a software template;
   determining availability of updated software for the compute instance based on comparing an aspect of the compute instance to a recommended software version retrieved from an update data repository of the enterprise network;
   calculating a composite update pause parameter based on a client-specific software update pause indication and a version of a security agent software executing on the compute instance; and
   updating software on the compute instance based on the availability of updated software and the composite update pause parameter indicating that updating software on the compute instance is permitted.

17. The computer program product of claim 16, further including generating the composite update pause parameter in response to detecting the request for services.

18. The computer program product of claim 17, wherein generating the composite update pause parameter includes combining a plurality of update pause inputs including update pause time factors, software template version, compute instance user type, compute instance enterprise network identifier, and compute instance security agent version.

19. A non-transitory computer readable medium containing a computer program product that, when executed by one or more computing devices, ensures automatic security updates in a virtual desktop infrastructure deployment environment by performing the steps of:

detecting an update to a versioned software template used to instantiate a plurality of virtual machine compute instances receiving services of a threat management facility for an enterprise network;

determining that the update originates from an administrator authorized to update the versioned software template;

updating software version data for the versioned software template in an update data repository accessible to the one or more computing devices;

calculating an update pause parameter for a compute instance of the plurality of virtual machine compute instances based on a client-specific software update pause indication and a version of a security agent software executing on the compute instance; and based on the update pause parameter, causing the compute instance of the plurality of virtual machine compute instances that are instantiated from the versioned software template to install a version of software consistent with the updated versioned software template.

20. The non-transitory computer readable medium of claim 19, further comprising calculating the update pause parameter for the compute instance based at least in part on detecting a request for services from the compute instance at the threat management facility.

* * * * *